(12) United States Patent
Sim et al.

(10) Patent No.: US 12,432,343 B2
(45) Date of Patent: Sep. 30, 2025

(54) VIDEO ENCODING AND DECODING USING ARBITRARY BLOCK PARTITIONING

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Dong Gyu Sim, Seoul (KR); Sea Nae Park, Seoul (KR); Jun Taek Park, Seoul (KR); Han Sol Choi, Dongducheon-si (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 121 days.

(21) Appl. No.: 18/105,105

(22) Filed: Feb. 2, 2023

(65) Prior Publication Data

US 2023/0179762 A1 Jun. 8, 2023

Related U.S. Application Data

(63) Continuation of application No. PCT/KR2021/010248, filed on Aug. 4, 2021.

(30) Foreign Application Priority Data

Aug. 4, 2020 (KR) .................. 10-2020-0097611
Aug. 7, 2020 (KR) .................. 10-2020-0099240
Aug. 4, 2021 (KR) .................. 10-2021-0102494

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/119* (2014.11);
(Continued)

(58) Field of Classification Search
CPC ..... H04N 19/11; H04N 19/119; H04N 19/105
(Continued)

(56) References Cited

U.S. PATENT DOCUMENTS 9,749,622 B2  8/2017 Merkle et al.
10,321,139 B2  6/2019 Merkle et al.
(Continued)

FOREIGN PATENT DOCUMENTS

KR   20180018570 A   2/2018
KR   20180082337 A   7/2018
(Continued)

*Primary Examiner* — Jeffery A Williams
(74) *Attorney, Agent, or Firm* — Lempia Summerfield Katz LLC

(57) ABSTRACT

A video decoding method for decoding a target block using intra prediction comprises decoding, from a bitstream, boundary line information specifying at least one boundary line for partitioning the target block. The boundary line information allows partitioning the target block into a plurality of non-rectangular blocks. The method further comprises determining intra prediction modes for the non-rectangular blocks based on the boundary line information; generating a prediction block of the target block by performing intra prediction on each of the non-rectangular blocks using the intra prediction modes; reconstructing a (Continued)

residual block of the target block from the bitstream; and reconstructing the target block by adding the prediction block and the residual block.

9 Claims, 16 Drawing Sheets

(51) Int. Cl.
    *H04N 19/119*     (2014.01)
    *H04N 19/176*     (2014.01)
    *H04N 19/18*     (2014.01)
    *H04N 19/46*     (2014.01)

(52) U.S. Cl.
    CPC ........... *H04N 19/176* (2014.11); *H04N 19/18* (2014.11); *H04N 19/46* (2014.11)

(58) Field of Classification Search
    USPC ..................................................... 375/240.12
    See application file for complete search history.

(56) References Cited

U.S. PATENT DOCUMENTS

| | | |
|---|---|---|
| 10,334,255 B2 | 6/2019 | Merkle et al. |
| 10,542,263 B2 | 1/2020 | Merkle et al. |
| 10,771,793 B2 | 9/2020 | Merkle et al. |
| 10,904,522 B2 | 1/2021 | Lim et al. |
| 11,032,555 B2 | 6/2021 | Merkle et al. |
| 2009/0268810 A1* | 10/2009 | Dai ...................... H04N 19/537 375/E7.243 |
| 2012/0307894 A1* | 12/2012 | Chien .................. H04N 19/176 375/E7.243 |
| 2013/0089265 A1* | 4/2013 | Yie ...................... H04N 19/147 382/238 |
| 2014/0247867 A1 | 9/2014 | Merkle et al. |
| 2016/0373782 A1 | 12/2016 | Zhao et al. |
| 2017/0318299 A1 | 11/2017 | Merkle et al. |
| 2017/0318313 A1 | 11/2017 | Merkle et al. |
| 2019/0246120 A1 | 8/2019 | Merkle et al. |
| 2019/0356913 A1 | 11/2019 | Lim et al. |
| 2020/0036985 A1 | 1/2020 | Jang et al. |
| 2020/0112730 A1 | 4/2020 | Merkle et al. |
| 2020/0260104 A1 | 8/2020 | Piao et al. |
| 2020/0404293 A1 | 12/2020 | Merkle et al. |
| 2021/0168380 A1 | 6/2021 | Merkle et al. |

FOREIGN PATENT DOCUMENTS

| | | |
|---|---|---|
| KR | 20190042090 A | 4/2019 |
| KR | 102062696 B1 | 1/2020 |
| KR | 20200038257 A | 4/2020 |

* cited by examiner (A)

(B)

(A)   (B)

VIDEO ENCODING AND DECODING USING ARBITRARY BLOCK PARTITIONING

CROSS-REFERENCE TO RELATED APPLICATION

This application is a continuation of PCT International Application No. PCT/KR2021/010248, filed on Aug. 4, 2021, which claims priority to Korean Patent Application No. 10-2020-0097611, filed on Aug. 4, 2020, Korean Patent Application No. 10-2020-0099240, filed on Aug. 7, 2020, and Korean Patent Application No. 10-2021-0102494, filed on Aug. 4, 2021, which are incorporated herein by reference in their entirety.

TECHNICAL FIELD

The present disclosure relates to video encoding and decoding using arbitrary block partitioning.

BACKGROUND

Since video data has a large amount of data compared to audio or still image data, it requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the picture size, resolution, and frame rate gradually increase, the amount of data to be encoded also increases. Accordingly, a new compression technique providing higher encoding efficiency and an improved image enhancement effect than existing compression techniques is required. In particular, a compression technique capable of more efficiently encoding pictures having complex textures, such as pictures including edges (boundaries between objects) in varying directions due to the presence of various objects, is required.

SUMMARY

The present disclosure proposes a method for efficiently encoding or decoding a video including edges in varying directions. More specifically, the present disclosure proposes a method for predicting and transforming a block including edges that are not horizontally or vertically oriented.

In accordance with one aspect of the present disclosure, a video decoding method is provided for decoding a target block using intra prediction. The method includes decoding, from a bitstream, boundary line information specifying at least one boundary line for partitioning the target block. The boundary line information allows partitioning the target block into a plurality of non-rectangular blocks. The method also includes determining intra prediction modes for the non-rectangular blocks based on the boundary line information. The method also includes generating a prediction block of the target block by performing intra prediction on each of the non-rectangular blocks using the intra prediction modes. The method also includes reconstructing a residual block of the target block from the bitstream and reconstructing the target block by adding the prediction block and the residual block.

Herein, the reconstruction of the residual block may include reconstructing the plurality of rectangular transform coefficient blocks from the bitstream. The reconstruction of the residual block may also include generating residual sub-blocks by inversely transforming the transform coefficient blocks. The reconstruction of the residual block may also include reconstructing the residual block by partitioning the target block into a plurality of areas based on a boundary line specified by the boundary line information, the number of transform coefficient blocks, and sizes of each of the transform coefficient blocks and rearranging residual signals in each of the residual sub-block into a corresponding area. The plurality of areas includes a boundary area including the boundary line and being formed around the boundary line and one or more non-boundary areas not including the boundary line.

In accordance with another aspect of the present disclosure, a video encoding method is provided for encoding a target block using intra prediction. The method includes partitioning the target block using at least one boundary line. The boundary line allows partitioning the target block into a plurality of non-rectangular blocks. The method also includes determining intra prediction modes for the non-rectangular blocks based on the boundary line. The method also includes generating a prediction block of the target block by performing intra prediction on each of the non-rectangular blocks and generating a residual block of the target block by subtracting the prediction block from the target block. The method also includes encoding boundary line information for specifying the boundary line and residual signals in the residual block.

Herein, the encoding of the residual signals in the residual block may include partitioning the target block into a plurality of areas. The plurality of areas may includes a boundary area including the boundary line and being formed around the boundary line and one or more non-boundary areas not including the boundary line. The encoding of the residual signals in the residual block may include generating a rectangular residual sub-block by rearranging residual signals in the area and transforming the residual sub-block for each of the plurality of areas.

DETAILED DESCRIPTION

Figure 1:
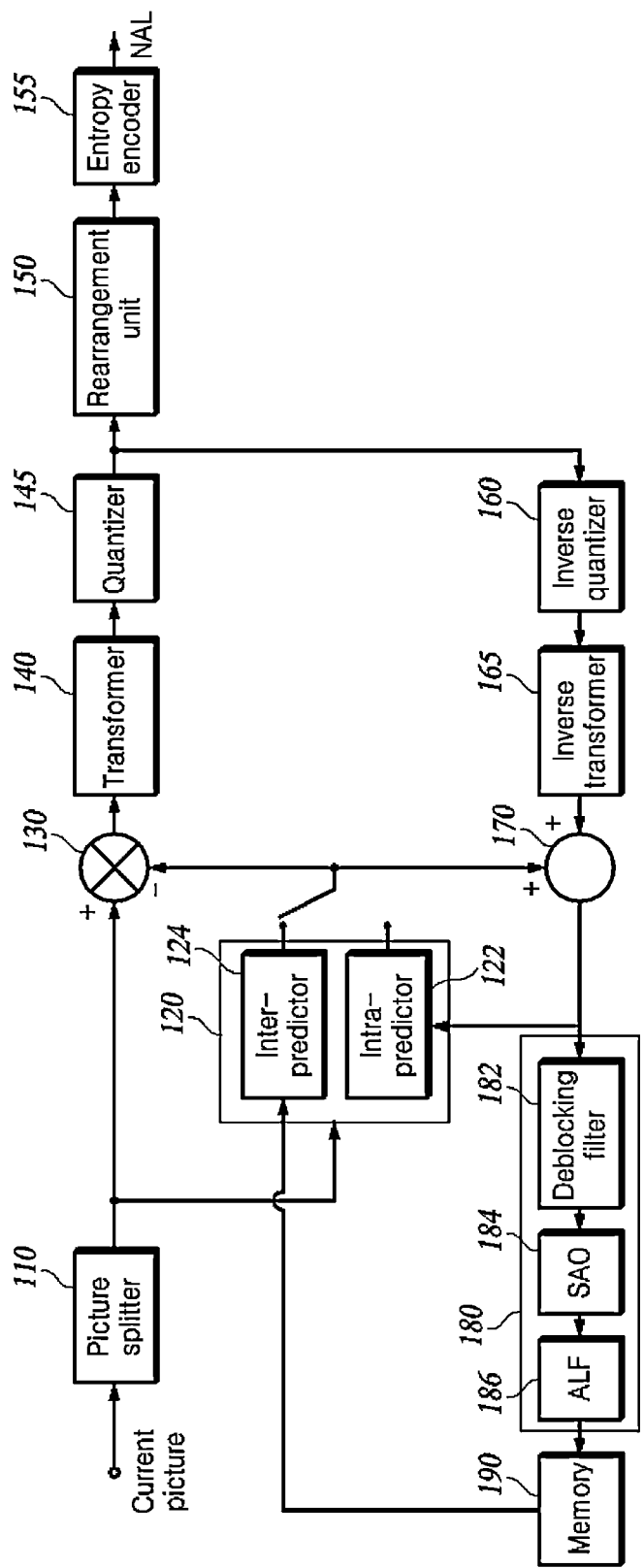
FIG. 1 is a block diagram of a video encoding apparatus that may implement the techniques of the present disclosure.

Hereinafter, some embodiments of the present disclosure are described in detail with reference to the accompanying drawings. It should be noted that, in adding reference numerals to the constituent elements in the respective drawings, like reference numerals designate like elements, although the elements are shown in different drawings. Further, in the following description of embodiments of the present disclosure, a detailed description of known functions and configurations incorporated herein has been omitted to avoid obscuring the subject matter of the embodiments.

FIG. 1 is a block diagram of a video encoding apparatus capable of implementing the techniques of the present disclosure. Hereinafter, a video encoding apparatus and elements of the apparatus are described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video is composed of one or more sequences including a plurality of pictures. Each picture is split into a plurality of regions, and encoding is performed on each region. For example, one picture is split into one or more tiles or/and slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting one or more pictures is encoded in a picture parameter set (PPS) or a picture header. Furthermore, information, which a sequence of a plurality of pictures refers to in common, is encoded in a sequence parameter set (SPS). In addition, information applied to one tile or tile group in common may be encoded as a syntax of a tile or tile group header. The syntaxes included in the SPS, PPS, slice header, and tile or tile group header may be referred to as high-level syntaxes.

In addition, a bitstream may include one or more Adaptation Parameter Sets (APS) including parameters referenced by a picture or a pixel group smaller than a picture, e.g., a slice. A picture header or a slice header includes an ID for identifying an APS to be used in the corresponding picture or slice. Pictures referencing different PPS s or slices referencing different picture headers may share the same parameters through the same APS ID.

Each of a plurality of pictures may be partitioned into a plurality of subpictures capable of being independently encoded/decoded and/or independently displayed. When subpicture partitioning is applied, information on the layout of subpictures within a picture is signaled.

The picture splitter 110 determines the size of a coding tree unit (CTU). Information about the size of the CTU (CTU size) is encoded as a syntax of the SPS or PPS and is transmitted to the video decoding apparatus.

The picture splitter 110 splits each picture constituting the video into a plurality of CTUs having a predetermined size and then recursively splits the CTUs using a tree structure. In the tree structure, a leaf node serves as a coding unit (CU), which is a basic unit of encoding.

The tree structure may be a QuadTree (QT), in which a node (or parent node) is split into four sub-nodes (or child nodes) of the same size. The tree structure may also be a BinaryTree (BT), in which a node is split into two sub-nodes. The tree structure may also be a TernaryTree (TT), in which a node is split into three sub-nodes at a ratio of 1:2:1. The tree structure may also be a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
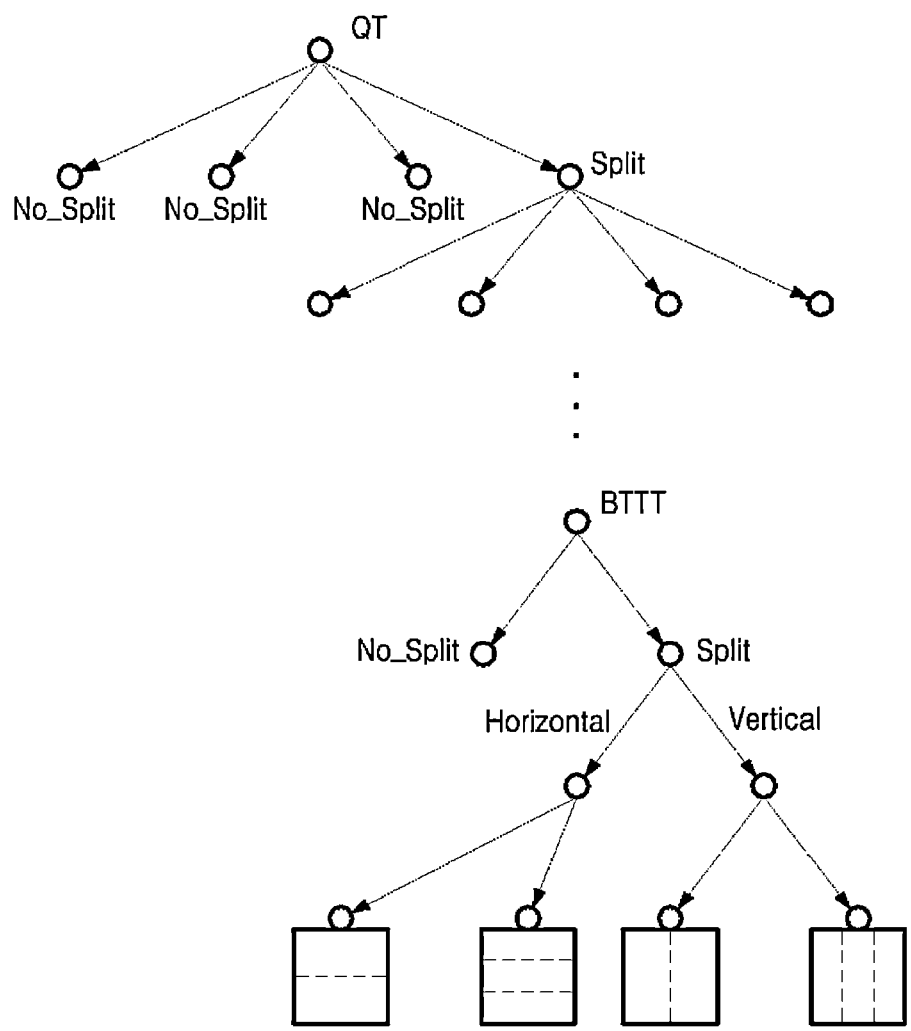
FIG. 2 illustrates a method for partitioning a block using a QuadTree plus BinaryTree TernaryTree (QTBTTT) structure.

FIG. 2 is a diagram illustrating a method for splitting a block using a QTBTTT structure. As shown in FIG. 2, a CTU may be initially split in the QT structure. The QT splitting may be repeated until the size of the splitting block reaches the minimum block size (MinQTSize) of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, i.e., a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3 or may include a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

Figure 3:
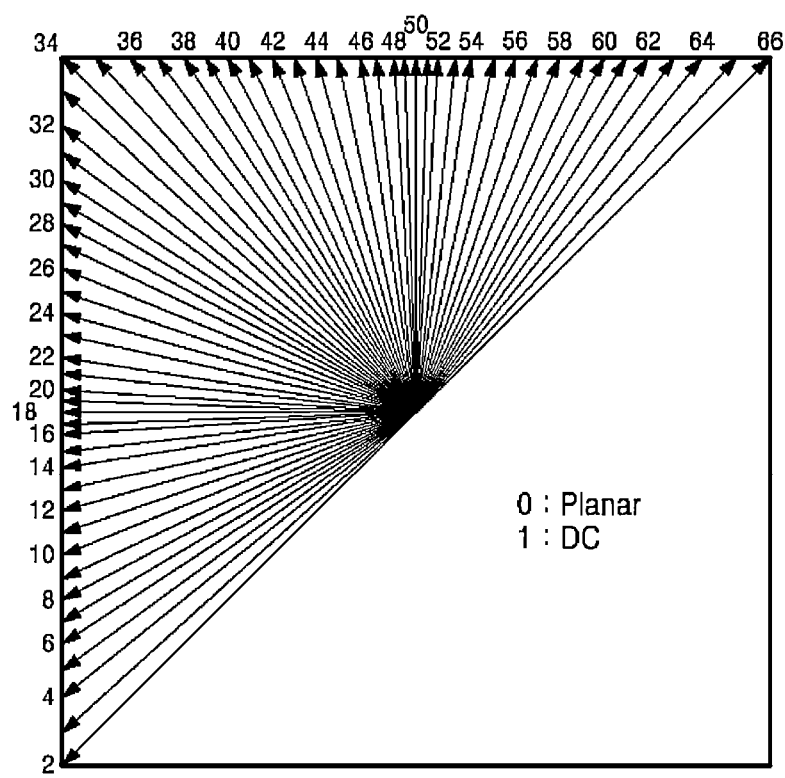
FIG. 3 illustrates a plurality of intra prediction modes.

The intra-predictor 122 configures reference samples from pre-reconstructed samples positioned around the current block in the current picture including the current block and predicts samples in the current block using the reference samples. There is a plurality of intra-prediction modes according to the prediction directions. For example, as shown in FIG. 3, the plurality of intra-prediction modes may include two non-directional modes, which include a planar mode and a DC mode, and 65 directional modes. Reference samples and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes and may select an intra-prediction mode that has the best rate distortion characteristics among the tested modes.

The intra-predictor 122 selects one intra-prediction mode from among the plurality of intra-prediction modes and predicts the current block using reference samples and an equation determined according to the selected intra-prediction mode. Information about the selected intra-prediction mode is encoded by the entropy encoder 155 and transmitted to the video decoding apparatus.

The inter-predictor 124 generates a prediction block for the current block through motion compensation. The inter-predictor 124 searches for a block most similar to the current block in a reference picture, which has been encoded and decoded earlier than the current picture. The inter-predictor 124 also generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The inter-predictor 124 may perform interpolation on a reference picture or a reference block in order to increase prediction accuracy. In other words, subsamples between two consecutive integer samples are interpolated by applying filter coefficients to a plurality of consecutive integer samples including the two integer samples. When the operation of searching for a block most similar to the current block is performed on the interpolated reference picture, the motion vector may be expressed at a precision level of fractional sample unit, not a precision level of integer sample unit. The precision or resolution of the motion vector may be set differently for each target region to be encoded, for example, each unit such as a slice, tile, CTU, or CU. When such an adaptive motion vector resolution is applied, information about motion vector resolution to be applied to each target region should be signaled for each target region. For example, when the target region is a CU, information about the motion vector resolution applied to each CU is signaled.

The inter-predictor 124 may perform inter-prediction using bi-prediction. In bi-directional prediction, the inter-predictor 124 uses two reference pictures and two motion vectors representing block positions most similar to the current block in the respective reference pictures. The inter-predictor 124 selects a first reference picture and a second reference picture from reference picture list 0 (RefPicList0) and reference picture list 1 (RefPicList1), respectively, searches for blocks similar to the current block in the respective reference pictures, and generates a first reference block and a second reference block. Then, the inter-predictor 124 generates a prediction block for the current block by averaging or weighting the first reference block and the second reference block. Then, the inter-predictor 124 transfers motion information including information about the two reference pictures and the two motion vectors used to predict the current block to the encoder 155. Here, RefPicList0 may be composed of pictures preceding the current picture in display order among the reconstructed pictures, and RefPicList1 may be composed of pictures following the current picture in display order among the reconstructed pictures. However, embodiments are not limited thereto. Pre-reconstructed pictures following the current picture in display order may be further included in RefPicList0, and conversely, and pre-reconstructed pictures preceding the current picture may be further included in RefPicList1.

Motion information (motion vector, reference picture) should be signaled to the video decoding apparatus. Various methods may be used to minimize the number of bits required to encode the motion information.

For example, when the reference picture and motion vector of the current block are the same as the reference picture and motion vector of a neighboring block, the motion information about the current block may be transmitted to the video decoding apparatus by encoding information for identifying the neighboring block. This method is called a "merge mode."

In the merge mode, the inter-predictor 124 selects a predetermined number of merge candidate blocks (hereinafter referred to as "merge candidates") from among the neighboring blocks of the current block.

Figure 4:
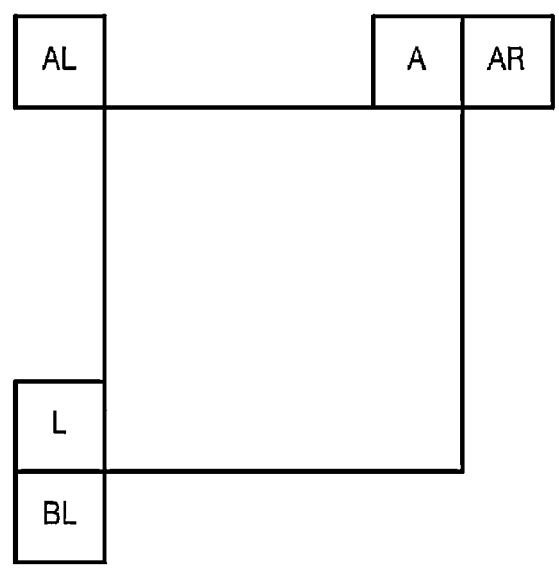
FIG. 4 illustrates neighboring blocks of a current block.

As illustrated in FIG. 4, all or part of a left block L, an above block A, an above right block AR, a bottom left block BL, and an above left block AL, which are adjacent to the current block in the current picture, may be used as neighboring blocks for deriving merge candidates. In addition, a block located within a reference picture (which may be the same as or different from the reference picture used to predict the current block) other than the current picture in which the current block is located may be used as a merge candidate. For example, a co-located block, which is at the same position as the current block or blocks adjacent to the co-located block in the reference picture, may be additionally used as merge candidates.

The inter-predictor 124 configures a merge list including a predetermined number of merge candidates using such neighboring blocks. The inter-predictor 124 selects a merge candidate to be used as the motion information about the current block from among the merge candidates included in the merge list and generates merge index information for identifying the selected candidates. The generated merge index information is encoded by the encoder 155 and transmitted to the video decoding apparatus.

Another method of encoding the motion information is an advanced motion vector prediction (AMVP) mode.

In the AMVP mode, the inter-predictor 124 derives predicted motion vector candidates for the motion vector of the current block by using neighboring blocks of the current block. All or part of the left block L, the above block A, the above right block AR, the bottom left block BL, and the above left block AL, which are adjacent to the current block in the current picture in FIG. 4, may be used as the neighboring blocks used to derive the predicted motion vector candidates. In addition, a block positioned within a reference picture (which may be the same as or different from the reference picture used to predict the current block) other than the current picture including the current block may be used as the neighboring blocks used to derive the predicted motion vector candidates. For example, a collocated block which is at the same position as the current block or blocks adjacent to the collocated block in the reference picture may be used.

The inter-predictor 124 derives predicted motion vector candidates using the motion vectors of the neighboring blocks and determines a predicted motion vector for the motion vector of the current block using the predicted motion vector candidates. Then, a motion vector difference is calculated by subtracting the predicted motion vector from the motion vector of the current block.

The predicted motion vector may be obtained by applying a predefined function (e.g., a function for calculating a median, an average, or the like) to the predicted motion vector candidates. In this case, the video decoding apparatus also knows the predefined function. Since the neighboring blocks used to derive the predicted motion vector candidates have already been encoded and decoded, the video decoding apparatus already knows the motion vectors of the neighboring blocks as well. Accordingly, the video encoding apparatus does not need to encode information for identifying the predicted motion vector candidates. Therefore, in this case, the information about the motion vector difference and the information about the reference picture used to predict the current block are encoded.

The predicted motion vector may be determined by selecting any one of the predicted motion vector candidates. In this case, information for identifying the selected predicted motion vector candidate is further encoded along with the information about the motion vector difference and the information about the reference picture, which are to be used to predict the current block.

The subtractor 130 subtracts the prediction block generated by the intra-predictor 122 or the inter-predictor 124 from the current block to generate a residual block.

The transformer 140 may transform residual signals in the residual block. The two-dimensional size of the residual block may be used as a transform unit (TU), which is a block size for performing transformation. Alternatively, a residual block may be partitioned into a plurality of sub-blocks, and residual signals in the corresponding sub-block may be transformed by using each sub-block as a TU.

The transformer 140 partitions the residual block into one or more sub-blocks and applies a transform to one or more sub-blocks to transform the residual values of sub-blocks from the pixel domain to the frequency domain. In the frequency domain, transformed blocks are referred to as coefficient blocks or transform blocks containing one or more transform coefficient values. Two-dimensional transform kernels may be used for transformation, and one-dimensional transform kernels may be used for horizontal and vertical transformations. The transform kernel may be based on the Discrete Cosine Transform (DCT) or Discrete Sine Transform (DST). A transform kernel may also be referred to as a transformation matrix.

The transformer 140 may transform the residual block in the horizontal direction and the vertical direction individually. For transformation, various types of transform kernels or transform matrices may be used. For example, pairs of transform kernels for horizontal transformation and vertical transformation may be defined as a multiple transform set (MTS). The transformer 140 may select one pair of transform kernels having the best transformation efficiency in the MTS and transform the residual block in the horizontal and vertical directions, respectively. The information (mts_idx) on the transform function pair selected in the MTS is encoded by the entropy encoder 155 and signaled to the video decoding apparatus.

The quantizer 145 quantizes transform coefficients output from the transformer 140 using quantization parameters and outputs the quantized transform coefficients to the entropy encoder 155. For some blocks or frames, the quantizer 145 may directly quantize a related residual block without transformation. The quantizer 145 may apply different quantization coefficients (scaling values) according to the positions of the transform coefficients in a transform block. A matrix of quantized coefficients applied to the two-dimensionally arranged quantized transform coefficients may be encoded and signaled to the video decoding apparatus.

The rearrangement unit 150 may re-sort the coefficient values for the quantized residual value. The rearrangement unit 150 may change the 2-dimensional array of coefficients into a 1-dimensional coefficient sequence through coefficient scanning. For example, the rearrangement unit 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. In other words, a scan mode to be used may be determined among the zig-zag scan, the diagonal scan, the vertical scan, and the horizontal scan according to the size of the transformation unit and the intra-prediction mode.

The entropy encoder 155 encodes the one-dimensional quantized transform coefficients output from the rearrangement unit 150 using various encoding techniques, such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction. The entropy encoder 155 also encodes intra-prediction information (i.e., information about an intra-prediction mode) or inter-prediction information (a merge index for the merge mode, information about a reference picture index and a motion vector difference for the AMVP mode) according to the prediction type. The entropy encoder 155 also encodes information related to quantization, i.e., information about quantization parameters and information about a quantization matrix.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The samples in the reconstructed current block are used as reference samples in performing intra-prediction of a next block.

The loop filter unit 180 filters the reconstructed samples to reduce blocking artifacts, ringing artifacts, and blurring artifacts generated due to block-based prediction and transformation/quantization. The loop filter unit 180 may include at least one of a deblocking filter 182, a sample adaptive offset (SAO) filter 184, and an adaptive loop filter (ALF) 186.

The deblocking filter 182 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed sample and an original sample caused by lossy coding and performs filtering in a manner of adding a corresponding offset to each reconstructed sample. The ALF 186 performs filtering on a target sample to be filtered by applying filter coefficients to the target sample and neighboring samples of the target sample. The ALF 186 may divide the samples included in a picture into predetermined groups and then determine one filter to be applied to a corresponding group to differentially perform filtering on each group. Information about filter coefficients to be used for the ALF may be encoded and signaled to the video decoding apparatus.

The reconstructed blocks filtered by the loop filter unit 180 are stored in the memory 190. Once all blocks in one picture are reconstructed, the reconstructed picture may be used as a reference picture for inter-prediction of blocks in a picture to be encoded next.

Figure 5:
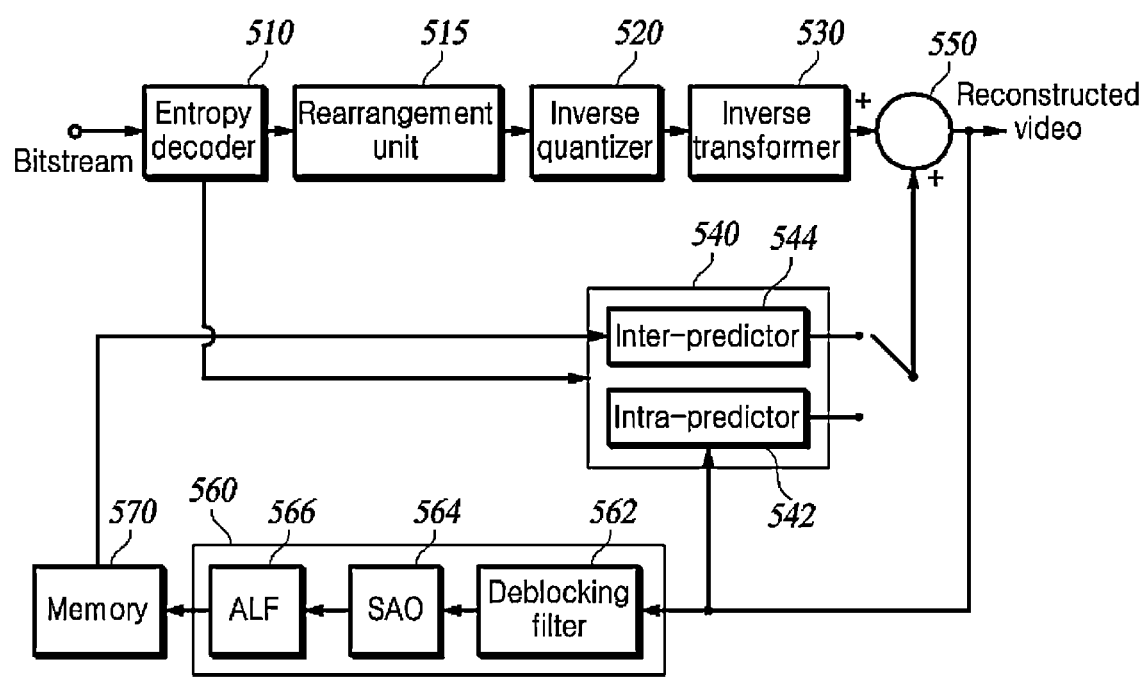
FIG. 5 is a block diagram of a video decoding apparatus that may implement the techniques of the present disclosure.

FIG. 5 is a functional block diagram of a video decoding apparatus capable of implementing the techniques of the present disclosure. Hereinafter, the video decoding apparatus and elements of the apparatus will be described with reference to FIG. 5.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 510 determines a current block to be decoded by decoding a bitstream generated by the video encoding apparatus and extracting information related to block splitting. The entropy decoder 510 extracts prediction information and information about a residual signal, or the like required to reconstruct the current block.

The entropy decoder 510 extracts information about the CTU size from the sequence parameter set (SPS) or the picture parameter set (PPS), determines the size of the CTU, and splits a picture into CTUs of the determined size. Then, the decoder determines the CTU as the uppermost layer, i.e., the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thus, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 510 extracts information about a prediction type indicating whether the current block is intra-predicted or inter-predicted. When the prediction type information indicates intra-prediction, the entropy decoder 510 extracts a syntax element for the intra-prediction information (intra-prediction mode) for the current block. When the prediction type information indicates inter-prediction, the entropy decoder 510 extracts a syntax element for the inter-prediction information, i.e., information indicating a motion vector and a reference picture referred to by the motion vector.

The entropy decoder 510 also extracts information related to quantization and extracts information about quantized transform coefficients of the current block as information about residual signals.

The rearrangement unit 515 may change the sequence of the one-dimensional quantized transform coefficients entropy-decoded by the entropy decoder 510 to a 2-dimensional coefficient array (i.e., block) in a reverse order of the coefficient scanning performed by the video encoding apparatus.

The inverse quantizer 520 inversely quantizes the quantized transform coefficients using the quantization parameter. The inverse quantizer 520 may apply different quantization coefficients (scaling values) to the quantized transform coefficients arranged in two dimensions. The inverse quantizer 520 may perform inverse quantization by applying a matrix of quantization coefficients (scaling values) from the video encoding apparatus to a two-dimensional array of quantized transform coefficients.

The inverse transformer 530 inversely transforms the inversely quantized transform coefficients from the frequency domain to the spatial domain to reconstruct residual signals. Thus, a reconstructed residual block for the current block may be generated. In addition, when the MTS is applied, the inverse transformer 530 determines transform kernels or transform matrices to be applied in the horizontal and vertical directions, respectively, using the MTS information (mts_idx) signaled from the video encoding apparatus. When the MTS is applied, the inverse transformer 530 also uses the determined transform kernels to inversely transform the transform coefficients in the transform block in the horizontal and vertical directions.

The predictor 540 may include an intra-predictor 542 and an inter-predictor 544. The intra-predictor 542 is activated when the prediction type of the current block is intra-prediction, and the inter-predictor 544 is activated when the prediction type of the current block is inter-prediction.

The intra-predictor 542 determines an intra-prediction mode of the current block among a plurality of intra-prediction modes based on the syntax element for the intra-prediction mode extracted from the entropy decoder 510. The intra-predictor 542 also predicts the current block using the reference pixels around the current block according to the intra-prediction mode.

The inter-predictor 544 determines a motion vector of the current block and a reference picture referred to by the motion vector, based on the syntax element for the inter-prediction mode extracted from the entropy decoder 510. The inter-predictor 544 also predicts the current block based on the motion vector and the reference picture.

The inter-predictor 544 may perform interpolation filtering according to the motion vector of the current block. In other words, when the fractional part of the motion vector is not 0, the inter-predictor 544 generates subsamples or fractional samples indicated by the fractional part through interpolation. When the fractional part of the horizontal component (x component) of the motion vector is not 0, interpolation is performed in the horizontal direction, and when the fractional part of the vertical component (y component) of the motion vector is not 0, interpolation is performed in the vertical direction.

The adder 550 reconstructs the current block by adding the residual block output from the inverse transformer 530 and the prediction block output from the inter-predictor 544 or the intra-predictor 542. The samples in the reconstructed current block are used as reference samples in intra-predicting a block to be decoded next.

The loop filter unit 560 may include at least one of a deblocking filter 562, an SAO filter 564, or an ALF 566. The deblocking filter 562 deblocking-filters the boundary between the reconstructed blocks to remove blocking artifacts caused by block-by-block decoding. The SAO filter 564 performs filtering in a manner of adding corresponding offsets to the reconstructed block after deblocking filtering to compensate for a difference between the reconstructed sample and the original sample caused by lossy coding. The ALF 566 performs filtering on a target sample to be filtered by applying filter coefficients to the target sample and neighboring samples of the target sample. The ALF 566 may divide the samples in a picture into predetermined groups and then determine one filter to be applied to a corresponding group to differentially perform filtering on each group. The filter coefficient of the ALF is determined based on the information about the filter coefficient decoded from the bitstream.

The reconstructed block filtered by the loop filter unit 560 is stored in the memory 570. When all blocks in one picture are reconstructed, the reconstructed picture is used as a reference picture for inter-prediction of blocks in a picture to be encoded next.

As described above, conventional video encoding apparatuses and video decoding apparatuses encode and decode a picture in units of square blocks or rectangular blocks. However, when an edge (e.g., a boundary between objects within a picture) is included in a picture in a direction other than horizontal or vertical direction, the square or rectangular block based coding may deteriorate coding efficiency. For example, a CTU to be partitioned into a tree structure may include edges in a diagonal direction. To efficiently encode the CTU, the CUs within the CTU containing an edge have to be recursively partitioned into smaller square or rectangular CUs. Repetitive partitioning causes an increase in the amount of encoding of partition information related to the tree structure partitioning of the CTU.

On the other hand, to reduce the amount of encoding of partition information or due to restrictions on the level or depth at which a CTU may be maximally split into a tree structure, the video encoding apparatus may no longer partition a CU including a diagonal edge. Square or rectangular block-based encoding of a CU increases the amount of encoding data of the corresponding CU, i.e., the number of bits required to encode residual signals.

The present disclosure provides a method for efficiently encoding pictures including edges in various directions using arbitrary block partitioning, i.e., geometric block partitioning.

1. Block Partitioning

The video encoding apparatus partitions a square or rectangular target block into non-rectangular blocks. Here, a rectangular block means a square or rectangular shaped block, and a non-rectangular block means a block that is not square or rectangular.

When an edge exists inside a target block, i.e., when the target block includes a boundary between objects, the video encoding apparatus may geometrically partition the target block into a plurality of non-rectangular sub-blocks based on the edge.

Figure 6:
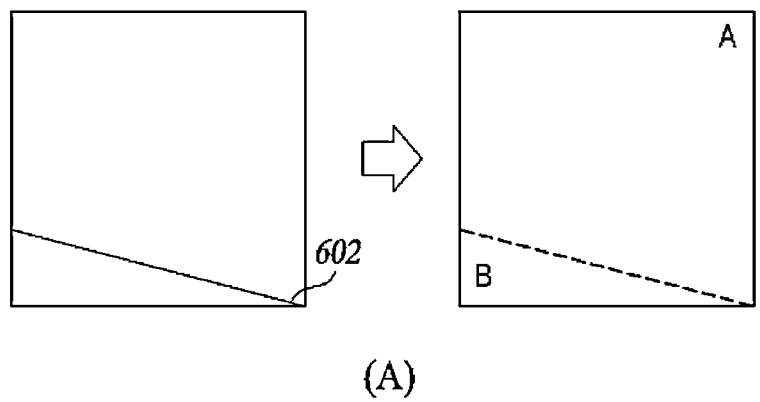
FIG. 6 illustrates partitioning a target block geometrically according to one aspect of the present disclosure.
Figure 6:
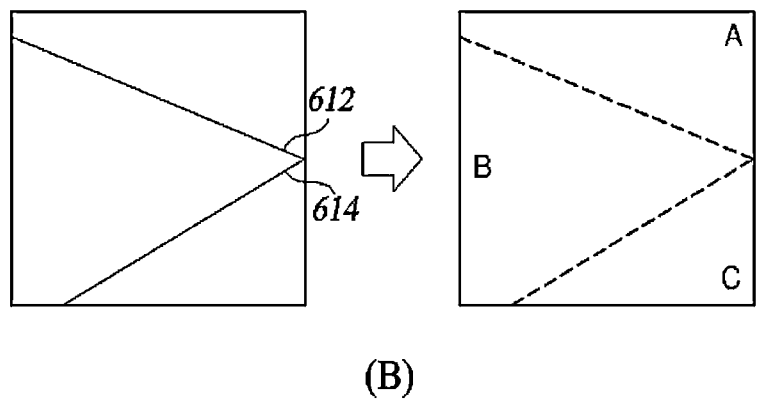

FIG. 6 illustrates partitioning a target block geometrically according to one embodiment of the present disclosure.

As shown in (A) of FIG. 6, when an edge 602 exists in the target block, the video encoding apparatus may partition the target block into sub-blocks A and B based on the edge 602.

As shown in (B) of FIG. 6, when two edges 612, 614 exist in the target block, the video encoding apparatus may partition the target block into three sub-blocks A, B, and C.

The video encoding apparatus encodes partition information related to the geometric partitioning of a target block. The partition information may include a flag indicating whether geometric partitioning, i.e., arbitrary block partitioning has been applied to the target block. Also, when the flag indicates geometric partitioning, the partition information includes partitioning mode information related to the geometric partitioning pattern of the target block.

The partitioning mode information includes information for representing a boundary line between sub-blocks and may further include information for indicating the number of boundaries.

As an embodiment, information on the boundary line may be defined as positions or coordinates of both endpoints where the boundary line meets the boundary of the target block. The positions of both endpoints may be expressed with varying degrees of precision. The accuracy of the positions of the two endpoints of the boundary line may be expressed in units of integer pixels or in units of fractional pixels, such as ½, ¼, ⅛, 1/16, or 1/32. The video encoding apparatus may directly signal the positions of both endpoints or signal the indices indicating the coordinates of both endpoints. For example, each side of the target block may be split according to a predefined number of equal intervals, and indices may be assigned to the partitioning points of each side. The video encoding apparatus may encode the indices of the partitioning points corresponding to both endpoints of the boundary line of the target block. An index for a partitioning point may be assigned in various ways. For example, an index may be assigned to each partitioning point in a clockwise direction from the target blocks upper left corner partitioning point. Alternatively, an index for the partitioning point may be independently assigned to each side of the target block. For example, indices starting from 0 may be assigned to the respective sides of the target block. In this case, the video encoding apparatus encodes, for each side of the target block, a flag indicating whether a partitioning point of a boundary line exists and then encodes an index for a partitioning point of a side where there exists the partitioning point.

As another embodiment, information on the boundary line may indicate the angle and position of the boundary line. The distance from the center of the target block to the boundary line may express the position of the boundary line. The angle and distance of the boundary line may be expressed with varying degrees of precision. For example, angles of the boundary line may be expressed in integer units, such as 1 or 2 degrees, or fractional angle units, such as ½, ¼, ⅛, 1/16, or 1/32. The distance of the boundary line may also be expressed with integer pixel or fractional pixel precision. The video encoding apparatus may directly signal the angle and distance of the boundary line or may signal the indices corresponding respectively to the angle and distance of the boundary line in the target block among predefined angles and distances.

Both endpoints of the boundary line or the angle and distance of the boundary line described above may be predictively encoded. For example, the video encoding apparatus may select, among pre-encoded blocks, a block, which has a partitioning mode identical or similar to the target block. The video encoding apparatus may encode the difference between both endpoints of the boundary line of the selected block and both endpoints of the boundary line of the target block or the difference between the distance and angle of the boundary line of the selected block and the distance and angle of the boundary line of the target block. Also, selection information indicating which block has been selected among pre-encoded blocks may be encoded. Here, the pre-encoded blocks may be selected from neighboring blocks adjacent to the target block, as shown in FIG. 4. Alternatively or additionally, the pre-encoded blocks may be selected from a predefined number of blocks recently encoded using geometric partitioning. Since the video encoding apparatus and the video decoding apparatus may select the pre-encoded blocks in the same way, signaling additional information for configuring the pre-encoded blocks is not required.

Figure 7:
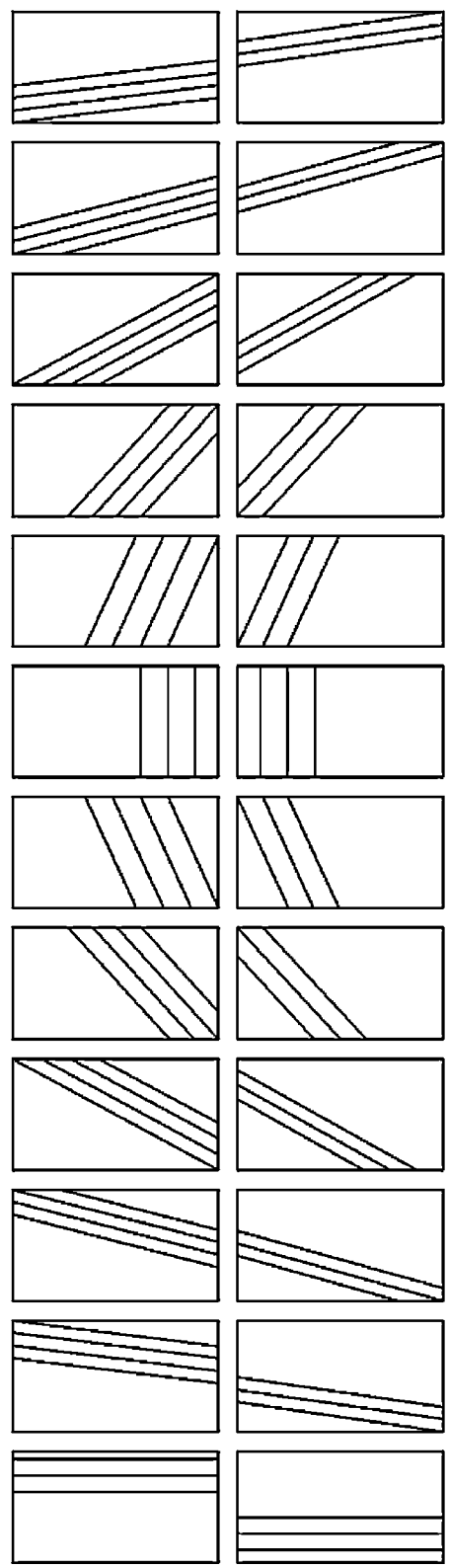
FIG. 7 illustrates various predefined boundaries according to one aspect of the present disclosure.

As another embodiment, the information on the boundary line may be expressed as an index indicating a boundary line in the target block among boundary lines in various predefined directions. FIG. 7 illustrates various predefined boundary lines. FIG. 7 shows 64 boundary lines. The video encoding apparatus encodes an index corresponding to the boundary line of a target block among the 64 boundary lines. When partitioning of the target block using a plurality of boundary lines is allowed, the video encoding apparatus may signal the number of boundary lines and as many indices as the number of boundary lines.

The video encoding apparatus encodes the partition information described above and signals the encoded partition information to the video decoding apparatus. The video decoding apparatus partitions the target block into sub-blocks using the partition information in the same way as the video encoding apparatus.

Meanwhile, the video encoding apparatus may signal a flag indicating whether geometric partitioning is enabled at a higher level than the target block, for example, at the level of SPS, PPS, slice, or tile. When the corresponding flag indicates that geometric partitioning is enabled, the partition information described above is signaled for the blocks in an image area corresponding to that level.

2. Prediction

The geometric partitioning described above may be applied to both inter prediction coding and intra prediction coding. In the case of geometric partitioning of a target block into a plurality of sub-blocks, the predictor 120 of the video encoding apparatus performs inter prediction or intra prediction on each sub-block. Prediction information used for inter or intra prediction is signaled to the video decoding apparatus. The predictor 540 of the video decoding apparatus uses the prediction information to predict each sub-block in the same manner as the predictor 120 of the video encoding apparatus.

2-1) Inter Prediction

The inter-predictor 124 of the video encoding apparatus determines motion vectors for respective sub-blocks and generates predicted sub-blocks for the respective sub-blocks using the corresponding motion vectors. Then, the inter-predictor 124 generates a prediction block for the target block by combining the predicted sub-blocks. To remove artifacts at the boundary between the sub-blocks, the inter-predictor 124 may perform additional filtering on the predicted pixels near the boundary between sub-blocks. The motion information of each sub-block is encoded by the encoder 155 and transmitted to the video decoding apparatus. The inter-predictor 544 of the video decoding apparatus generates a prediction block of the target block by predicting each sub-block using the received motion information in the same manner as the inter-predictor 124 of the video encoding apparatus.

Meanwhile, geometric partitioning may be applied only when a target block is encoded in the merge or skip mode. In this case, as described above, the inter-predictor 124 constructs a merge list including a predetermined number of merge candidates from neighboring blocks of the target block. Subsequently, the inter-predictor 124 selects a merge candidate to be used as a motion vector of each sub-block among merge candidates included in the merge list and generates merge index information for identifying the selected candidate.

The merge index information for each sub-block is encoded by the encoder 155 and transmitted to the video decoding apparatus. The inter-predictor 544 of the video decoding apparatus that receives the merge index information of each sub-block constructs a merge list in the same way as the inter-predictor 124 of the video encoding apparatus and predicts each sub-block by selecting a merge candidate indicated by the merge index information from the merge list.

2-2) Intra Prediction

The intra-predictor 122 of the video encoding apparatus constructs reference pixels (reference samples) from the pre-reconstructed pixels around the target block and determines an intra prediction mode for each sub-block. Then, the intra-predictor 122 predicts each sub-block from the reference pixels according to the determined intra prediction mode. The intra-predictor 542 of the video decoding apparatus predicts each sub-block using the information received from the video encoding apparatus in the same manner as the intra-predictor 122 of the video encoding apparatus.

Since the operation of the intra-predictor 542 of the video decoding apparatus is the same as that of the intra-predictor 122 of the video encoding apparatus, the operation of the video encoding apparatus is mainly described below.

Based on the angle (or direction) of a boundary line, the position of a boundary line in the target block (or the distance from the center of the target block to the boundary line), the position of a sub-block relative to the boundary line, and one or more of the locations of neighboring lines (columns and/or rows of pixels) of the target block used to configure reference pixels, reference pixels for each sub-block may be configured differently. When a target block is partitioned based on boundaries between objects, each sub-block is highly likely to have different texture properties because the sub-blocks belong to different objects. On the other hand, blocks located in the same direction based on a boundary line are highly likely to have similar texture characteristics. Accordingly, reference pixels for each sub-block are configured using neighboring pixels located in the same direction as the corresponding sub-block with respect to the boundary line.

Figure 8:
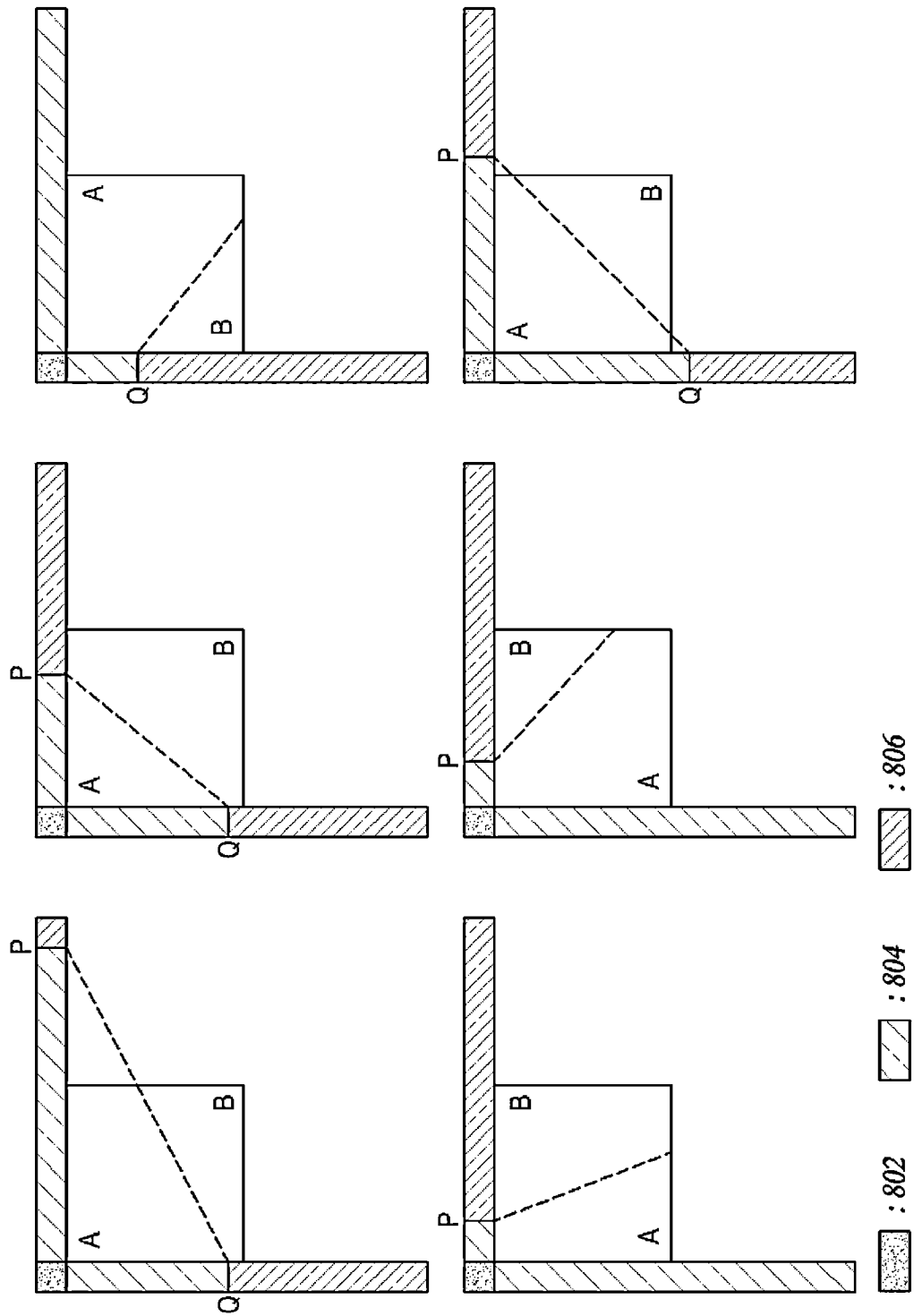
FIG. 8 is a diagram illustrating a method for configuring reference pixels for the respective sub-blocks according to one aspect of the present disclosure.

FIG. 8 is a diagram illustrating a method for configuring reference pixels for the respective sub-blocks.

The reference pixels may be configured using neighboring pixels included in a row adjacent to the upper side of the target block and a column adjacent to the left side of the target block. As shown in FIG. 8, reference pixels for sub-block A are composed of neighboring pixels 802, 804 located in the same direction as sub-block A based on a boundary line among neighboring pixels included in the upper row or left column. Similarly, reference pixels for sub-block B are composed of neighboring pixels 806 located in the same direction as sub-block B based on the boundary line among neighboring pixels included in the upper row or left column. The example of FIG. 8 relates to a method for configuring reference pixels when encoding/decoding of blocks proceeds from left to right in the horizontal direction and from top to bottom in the vertical direction, as in the raster scan order. However, a different encoding/decoding order may be used, and neighboring pixels adjacent to the target blocks right or lower side may be used as reference pixels according to the encoding/decoding order.

The intra-predictor 122 may specify a boundary line within the target block using the angle (or direction) of the boundary line and the position of the boundary line within the target block and determine the positions (P, Q) at which the boundary line meets the upper row and left column. The intra-predictor 122 determines reference pixels located in the same direction as each sub-block based on the boundary line using positions P and Q.

As shown in FIG. 8, reference pixels may be configured using neighboring pixels included in an upper row and a left column immediately adjacent to a target block, but the present disclosure is not limited to the specific example. For example, the intra-predictor 122 may configure reference pixels using pre-reconstructed neighboring pixels included in other rows or columns not immediately adjacent to the target block.

Figure 9:
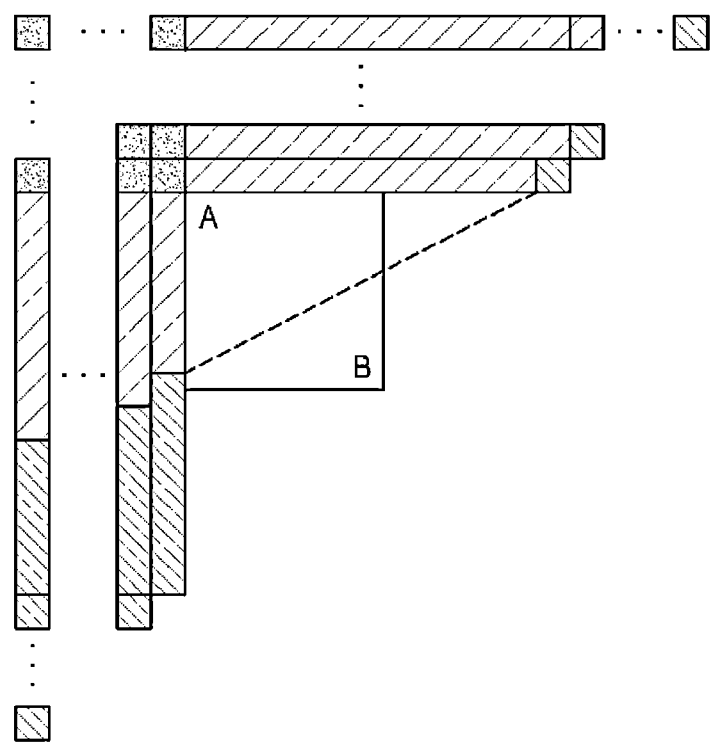
FIG. 9 is another diagram illustrating a method for configuring reference pixels for the respective sub-blocks according to one aspect of the present disclosure.

FIG. 9 is another diagram illustrating a method for configuring reference pixels for the respective sub-blocks.

As shown in FIG. 9, the intra-predictor 122 may configure reference pixels using not only a line immediately adjacent to the target block but also neighboring pixels included in at least one non-neighboring line. For example, the reference pixels may be constructed using neighboring pixels included in a predetermined number of columns on the left side of the target block and a predetermined number of rows on the upper side of the target block. The intra-predictor 122 may select which line to use among a plurality of lines. The intra-predictor 122 may calculate the position where the selected line and the boundary line meet and construct reference pixels for the respective sub-blocks differently using the calculated position. Meanwhile, index information on a selected line among a plurality of lines may be encoded and transmitted to the video decoding apparatus. The video decoding apparatus uses the received index information to select a line for constructing reference pixels among a plurality of lines. An index for each line (row and column) may be assigned according to how that line is apart from the target block. For example, index 0 may be assigned to the first line immediately adjacent to the target block, index 1 may be assigned to the second line, and so on. Depending on embodiments, a plurality of rows and columns may be used instead of one row and column. Information on a plurality of rows and columns may be transmitted through the respective indices. Alternatively, indices for selecting one or more candidates from a list consisting of candidates, each of which forms a pair with two or more lines, may be transmitted. Also, indices of left and upper lines may be configured differently. For example, the first line may be selected from the left columns, and the second line may be selected from the upper rows.

As shown in FIG. 3, intra prediction modes used to predict each sub-block may include directional modes and non-directional modes (e.g., DC mode and PLANAR mode). An intra prediction mode for each sub-block may be selected based on at least one of the angle (or direction) of the boundary line or the positions of sub-blocks within the target block.

In some embodiments, directional modes applicable to each sub-block may be limited based on at least one of the angle (or direction) of a boundary line or positions of sub-blocks within a target block relative to the boundary line. In other words, based on at least one of the angle (or direction) of the boundary line or the positions of sub-blocks in the target block, only part of the entire intra prediction modes may be selected for each sub-block. As described above, each sub-block is predicted using different reference samples. Accordingly, the intra-predictor 122 limits directional modes applicable to each sub-block so that only the reference samples allowed for each sub-block are used. This restriction reduces the number of bits required to encode the intra prediction modes of the respective sub-blocks.

For example, when the angle (or direction) of the boundary line is called boundary_angle, the directional modes may be classified into two sets: one is a set of directional modes whose angles range from boundary_angle to (boundary_angle+180 degrees), i.e., from boundary_angle to (boundary_angle+180 degrees) in the counterclockwise direction, and the other is a set of directional modes whose angles belong to the outside of the range above. The intra-predictor 122 applies directional modes belonging to different sets to the respective sub-blocks. Referring to the example of FIG. 10, the target block is partitioned into sub-block A and sub-block B by a boundary line with an angle of 45 degrees connecting the upper right corner and the lower left corner of the target block. The sub-block A is predicted using the upper left reference pixel 1002 of the target block and the upper and left reference pixels 1004, and the sub-block B is predicted using the upper right and lower left pixels 1006. Therefore, the directional mode applicable to sub-block A is limited to the intra prediction mode having an angle within the range from 45 degrees to 225 degrees in the counterclockwise direction, and the directional mode applicable to sub-block B is limited to the intra prediction mode having an angle within the range from 45 degrees to −135 degrees in the clockwise direction. For various geometric partitioning patterns shown in FIG. 8, the directional modes allowed for sub-blocks A and B may be adaptively changed according to the boundary line's angle and the sub-blocks position relative to the boundary line.

Figure 10:
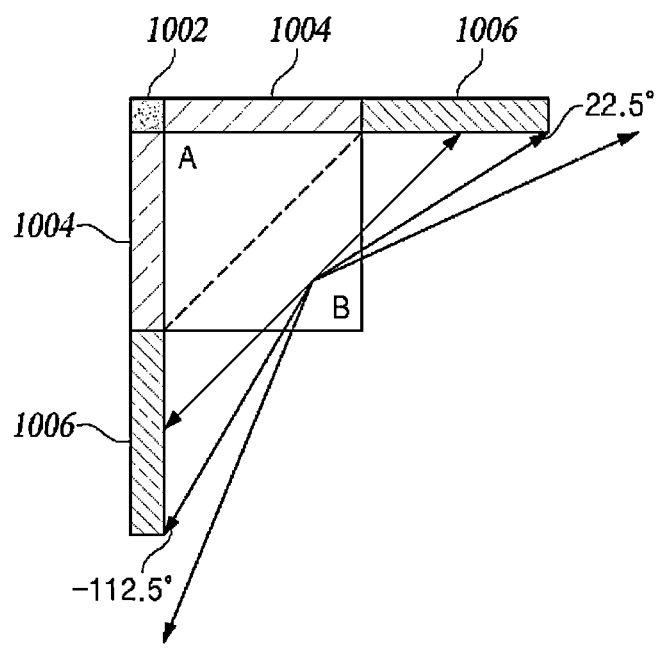
FIG. 10 illustrates a method for determining an intra prediction mode of each sub-block according to one aspect of the present disclosure.

Also, the directional modes may be limited according to the range of available reference pixels. In the embodiment of FIG. 10, the number of reference pixels 1006 of sub-block B may be limited by the horizontal and vertical lengths of the target block including sub-block B. Accordingly, directional modes incapable of referencing the reference pixels 1006 are not used as the intra prediction modes of sub-block B. For example, when the target block size in FIG. 10 is N×N, available reference pixels may be restricted to 2N neighboring samples consecutive in the horizontal (row) direction from the sample immediately above the top left sample in the target block and 2N neighboring pixels consecutive in the vertical (column) direction from the sample immediately to the left of the top left sample. In this case, the intra prediction modes allowed for sub-block B are limited to −130 to −112.5 degrees and 22.5 to 45 degrees.

In the present embodiment, the intra-predictor 122 selects intra prediction modes to be applied to each sub-block based on the boundary line. The intra-predictor 122 then determines an intra prediction mode of the sub-block among intra prediction modes selected for the sub-blocks. Information representing the determined intra prediction mode is delivered to the video decoding apparatus. In the same way as the intra-predictor 122 of the video encoding apparatus, the intra-predictor 542 of the video decoding apparatus selects intra prediction modes for each sub-block based on the boundary line. Then, the intra-predictor 542 determines an intra prediction mode of the sub-block among intra prediction modes selected for the sub-block.

In another embodiment, the restriction on the intra prediction mode for each sub-block may be performed under a specific condition. The intra-predictor 122 may check the intra prediction mode of at least one neighboring block including at least part of the reference pixels configured for each sub-block and determine whether to limit the intra prediction modes for the corresponding sub-block by comparing the angle indicated by the intra prediction mode of a neighboring block and the angle of the boundary line. For example, the intra-predictor 122 checks the intra prediction modes of one or more neighboring blocks including at least one pixel among the reference pixels 1002, 1004 of the sub-block A. Suppose an intra prediction mode gets out of the range from 45 degrees to 225 degrees among the intra prediction modes of the neighboring blocks. In that case, there are chances that the texture characteristics of the two areas partitioned by the boundary line are not distinguished from each other. Accordingly, the intra-predictor 122 does not limit the intra prediction modes of sub-block A. In this case, the reference pixels of sub-block A may not be limited to the neighboring pixels indicated by 1002 and 1004 in FIG. 10.

For each of the sub-blocks, the intra-predictor 122 determines an intra prediction mode of the sub-block among intra prediction modes applicable to the sub-block and generates a predicted sub-block using the determined intra prediction mode.

Intra prediction modes for the respective sub-blocks are encoded and transmitted to the video decoding apparatus. The video encoding apparatus may encode information directly indicating the intra prediction mode for each sub-block but may also predictively encode the information.

In some embodiments, the video encoding apparatus constructs a candidate list using intra prediction modes of neighboring blocks of a target block. The candidate list is shared for all sub-blocks. The video encoding apparatus signals index information for identifying an intra prediction mode of each sub-block from the candidate list. As an example, the video encoding apparatus selects a prediction mode having a mode number closest to the intra prediction mode of a sub-block among prediction modes included in the candidate list and encodes an index corresponding to the selected prediction mode. Then, a difference value between the actual intra prediction mode of the sub-block and the prediction mode corresponding to the encoded index is encoded. As another example, the difference value may be encoded when the prediction mode of the sub-block does not exist in the candidate list, i.e., when the actual intra prediction mode of the sub-block is not the same as the prediction mode corresponding to the encoded index. To this end, a flag indicating whether a prediction mode of a sub-block exists in the candidate list may be encoded before the difference value.

In another embodiment, the candidate list may be configured differently for each sub-block based on at least one of the direction (or angle) of a boundary line or the location of each sub-block partitioned by the boundary line. Referring to FIG. 10, as described above, it is highly likely that sub-block A has texture characteristics similar to those of neighboring blocks including at least part of the neighboring pixels 1004 located at the top or left of the target block and the neighboring pixels 1002 located at the top left of the target block. Therefore, the video encoding apparatus may generate a candidate list for sub-block A from the intra prediction modes of neighboring blocks including at least part of the neighboring pixels 1002, 1004. The sub-block B is highly likely to have texture characteristics similar to those of neighboring blocks including at least part of the neighboring pixels 1006 located at the upper right or lower left of the target block. Accordingly, the video encoding apparatus may generate a candidate list for the sub-block B from intra prediction modes of neighboring blocks including at least part of the neighboring pixels 1006.

In the present embodiment, a method for encoding information for identifying an intra prediction mode of the corresponding sub-block from each candidate list may be the same as in the embodiment described above. As another example, the video encoding apparatus encodes a flag indicating whether an intra prediction mode of a sub-block exists in the corresponding candidate list. Suppose the intra prediction mode of the sub-block exists in the corresponding candidate list. In that case, the index corresponding to the intra prediction mode of the sub-block from the candidate list is encoded. Otherwise, identification information for identifying the intra prediction mode of the sub-block among the remaining intra prediction modes other than the prediction modes included in the candidate list is encoded from the intra prediction modes applicable to the sub-block.

Figure 11:
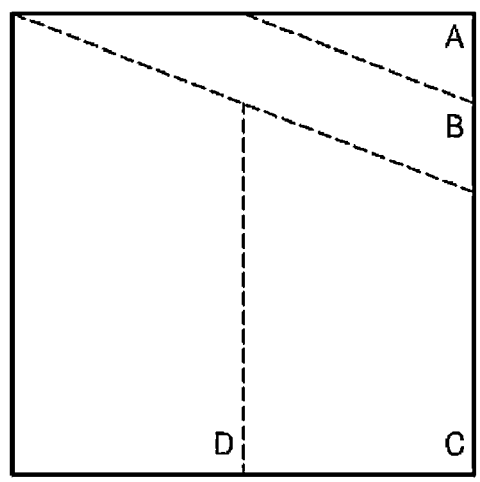
FIG. 11 illustrates a method for encoding an intra prediction mode of each sub-block according to one aspect of the present disclosure.

The video encoding apparatus may encode intra prediction modes for the respective sub-blocks independently and individually. Alternatively, for part of the sub-blocks, prediction modes may be encoded in the same manner as described above, and for the remaining sub-blocks, difference values from the intra prediction modes of the part of sub-blocks may be encoded. For example, the video encoding apparatus classifies sub-blocks into groups having prediction modes similar to each other. Then, for each group, the video encoding apparatus encodes the intra prediction mode of one sub-block using the method of the embodiment described above and encodes the intra prediction modes of the remaining sub-blocks in the group using the difference values from the encoded intra prediction mode of the one sub-block. Referring to FIG. 11, when boundary lines are considered, sub-blocks A and B and sub-blocks C and D are highly likely to have intra prediction modes similar to each other. Therefore, the video encoding apparatus encodes intra prediction modes of sub-blocks A and C according to the embodiments described above. The prediction modes of sub-blocks B and D are respectively encoded using the prediction mode difference between sub-blocks B and A and using the prediction mode difference between sub-blocks D and C.

The intra-predictor 542 of the video decoding apparatus intra predicts each sub-block using the intra prediction modes of the respective sub-blocks received from the video encoding apparatus. Since the operation of the intra-predictor 542 of the video decoding apparatus is the same as that of the intra-predictor 122 of the video encoding apparatus, further descriptions have been omitted.

Meanwhile, matrix-based intra prediction (MIP) may be applied to predict each sub-block. To predict sub-blocks geometrically partitioned from a target block using the MIP mode, the intra-predictor 122 configures reference samples for each sub-block in the same manner as described above, performs matrix operations using different reference samples for each sub-block, and generates prediction sub-blocks for each sub-block.

Referring to FIG. 10, the intra-predictor 122 configures reference samples 1002, 1004 for sub-block A and generates an input vector for matrix operation from the reference samples 1002, 1004. The input vector may be generated by down sampling the reference samples. For example, the input vector may be generated by averaging a predefined number of consecutive reference samples. The intra-predictor 122 multiplies the input vector by a matrix to generate predicted pixels constituting sub-block A. The predicted pixels are rearranged according to the shape of sub-block A. The intra-predictor 122 generates a final predicted sub-block corresponding to the shape of sub-block A through interpolation using the generated predicted pixels and the reference pixels 1002, 1004 of sub-block A.

The intra-predictor 122 constructs an input vector from the reference samples 1006 for sub-block B. Then, a predicted sub-block corresponding to sub-block B is generated in the same manner as applied to sub-block A.

Meanwhile, a plurality of matrices may be available for MIP. Each sub-block may use the same matrix or different matrices. Information for identifying the used matrix is encoded and transmitted to the video decoding apparatus.

To predict each sub-block, intra block copy (IBC) may be applied. The intra-predictor 122 determines block vectors indicating a block most similar to each sub-block within a pre-decoded area of a current picture including a target block. Then, the intra-predictor 122 generates predicted sub-blocks for the respective sub-blocks using the pre-reconstructed pixels of the area indicated by each block vector.

When predicted sub-blocks for the respective sub-blocks are generated according to the intra prediction method described above, a predicted block for a target block is generated by combining the predicted sub-blocks. To remove artifacts at the boundary between sub-blocks, filtering may be performed on the predicted pixels around the boundary between sub-blocks. Alternatively or additionally to the filtering, offsets corresponding to each sample position may be added to the predicted samples in the predicted block of the target block. Here, offsets may be generated through position-based intra prediction. Position-based intra prediction may be the PLANAR mode or the position dependent intra prediction combination (PDPC) defined by the VVC standard.

3. Transformation

The transformer 140 of the video encoding apparatus transforms a residual block, which is a difference between a target block and a predicted block of the target block, into a transform coefficient block in the frequency domain. The transform coefficients in the transform coefficient block are encoded and signaled to the video decoding apparatus and inversely transformed into a residual block in the spatial domain by the inverse transformer 530 of the video decoding apparatus.

In some embodiments of the present disclosure, the transformer 140 of the video encoding apparatus may transform a target block using the same transform unit as the size of the target block or may independently transform each sub-block. For example, the transformer 140 may rearrange the residual signals in each sub-block into a rectangular or square shape to generate rectangular or square-shaped residual blocks and transform the rectangular or square-shaped residual blocks independently or individually.

Figure 12:
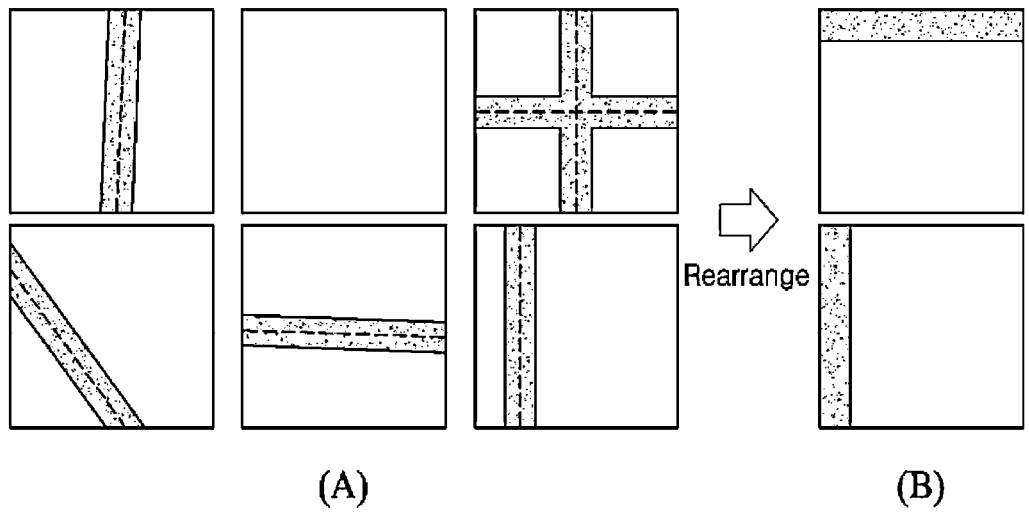
FIG. 12 illustrates a method for transforming a target block geometrically partitioned into a plurality of sub-blocks according to one aspect of the present disclosure.

In another embodiment of the present disclosure, as shown in FIG. 12, the transformer 140 classifies the residual signals in the target block into an area of residual signals near the boundary and the other area and generates rectangular or square-shaped residual sub-blocks by rearranging the residual signals in each area. The transformer 140 individually transforms and quantizes the residual sub-blocks to generate transform coefficient blocks corresponding to the respective sub-blocks. The transform coefficients in each transform coefficient block are encoded and transmitted to the video decoding apparatus. The transformer 530 of the video decoding apparatus generates a plurality of residual sub-blocks by inversely transforming and dequantizing each of the transform coefficient blocks. Then, the transformer 530 generates a residual block for the target block by arranging the residual signals in each residual sub-block to the original positions in the corresponding area of the target block. In what follows, a method for encoding residual signals in the target block is described in detail.

Figure 13:
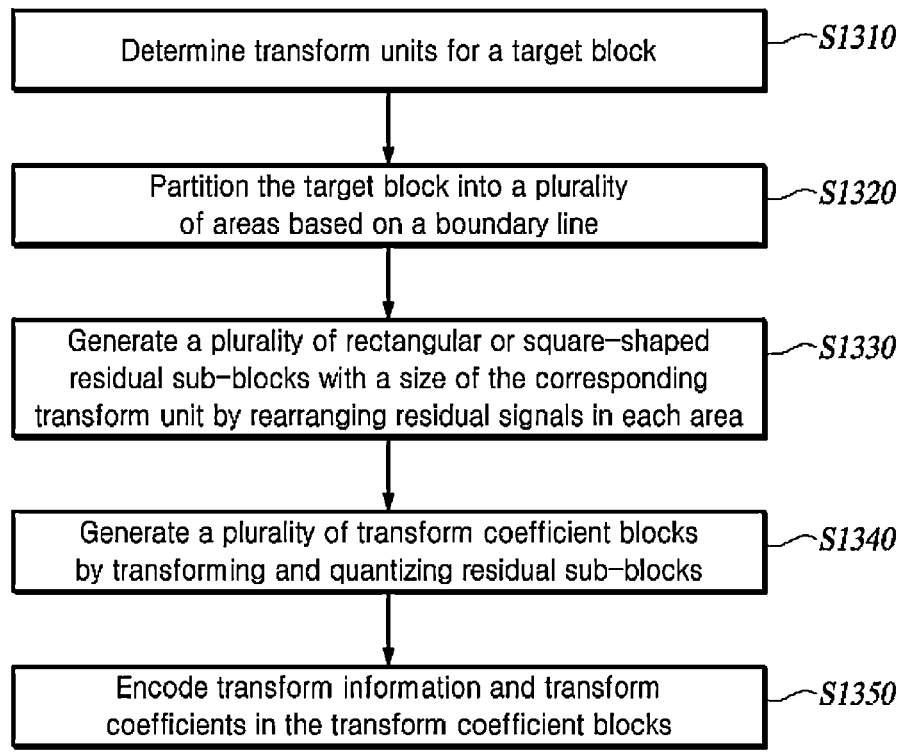
FIG. 13 is a flow diagram illustrating a method for encoding residual signals in a target block geometrically partitioned into a plurality of sub-blocks according to one aspect of the present disclosure.

FIG. 13 is a flow diagram illustrating a method for encoding residual signals in a target block geometrically partitioned into a plurality of sub-blocks according to one embodiment of the present disclosure.

The transformer 140 of the video encoding apparatus determines a plurality of transform units to transform a target block S1310. A transform unit has a size of one-dimensional or two-dimensional block partitioned from the target block so as not to overlap each other and means a unit in which transform is performed. Also, the transformer 140 may determine a transform kernel for transforming the residual signals corresponding to each transform unit among a plurality of transform kernels.

Figure 14:
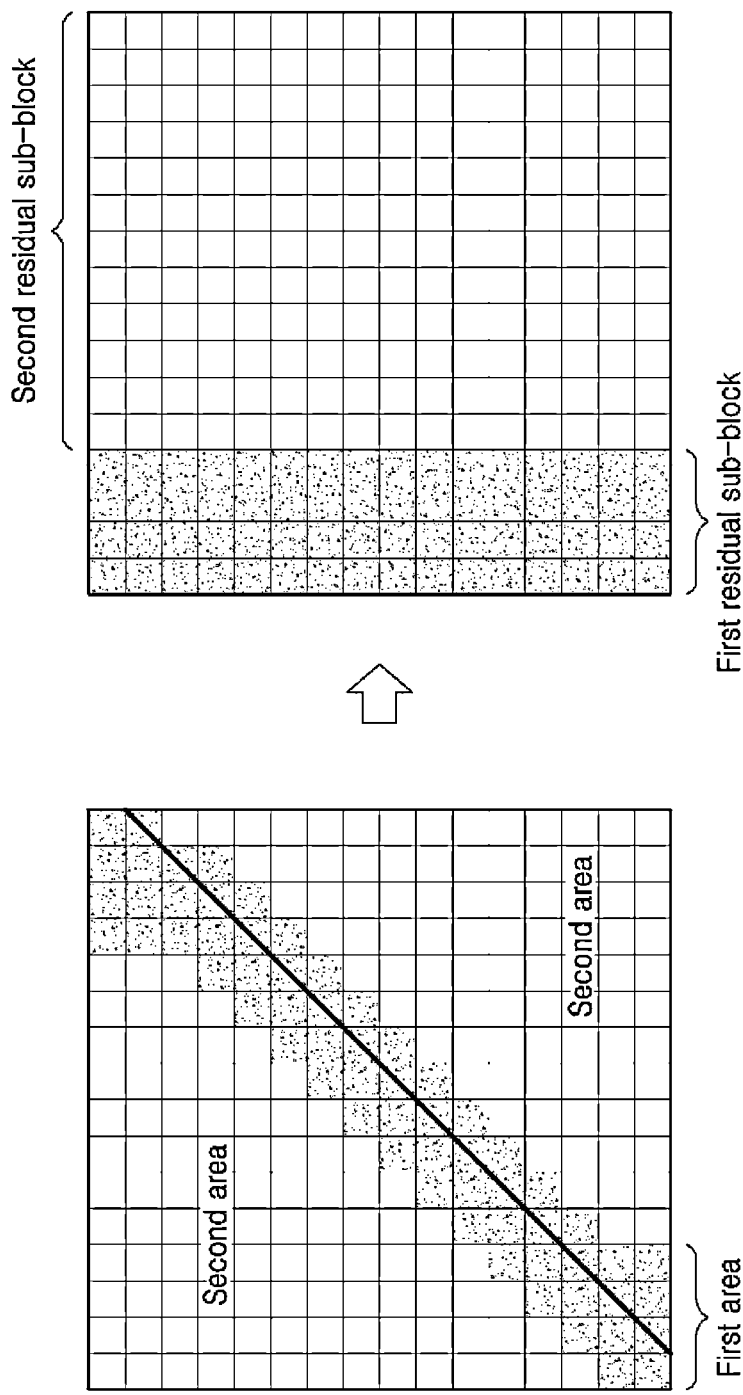
FIGS. 14 and 15 illustrate a method for partitioning a target block into non-rectangular areas and rearranging residual signals within a non-rectangular area according one aspect of the present disclosure.

As shown in FIG. 14, the transformer 140 partitions the target block into a plurality of areas in consideration of the boundary lines between the geometrically partitioned sub-blocks S1320 and generates a plurality of residual sub-blocks in a rectangular or square shape with a size of the corresponding transform unit by rearranging residual signals in each area S1330. The plurality of areas includes a boundary area including a boundary line and one or more non-boundary areas not including the boundary line. The number of areas partitioned from the target block may be equal to the number of transform units. Also, the number of samples in each area may be the same as the number of samples in the corresponding transform unit. For example, when the horizontal length of the transform unit is $2^m$, and the vertical length is $2^n$, the number of samples in the area corresponding to the transform unit is $2^m \times 2^n$.

For example, as illustrated in FIG. 14, a plurality of areas may include a first area (boundary area) including a boundary line and a second area (non-boundary area) excluding the first area from the target block and not including the boundary line. The first area may be a set of rows, each of which is composed of a predetermined number of consecutive samples in the horizontal direction. FIG. 14 illustrates an example in which each row in the first area contains four samples in the horizontal direction. However, the present disclosure is not limited to the specific example, and the first area may be a set of columns, each of which consists of a predetermined number of consecutive samples in the vertical direction. The number of samples in the horizontal or vertical direction, which constitute the first area, may be determined by considering the size of a transform unit determined in accordance with the first area, i.e., the number of samples in the transform unit. The first area is configured so that the number of samples in the first area equals the number of samples in the corresponding transform unit. Also, the type of transform kernel to be applied to the residual signals in the first area may be additionally considered to determine the number of samples.

Figure 15:
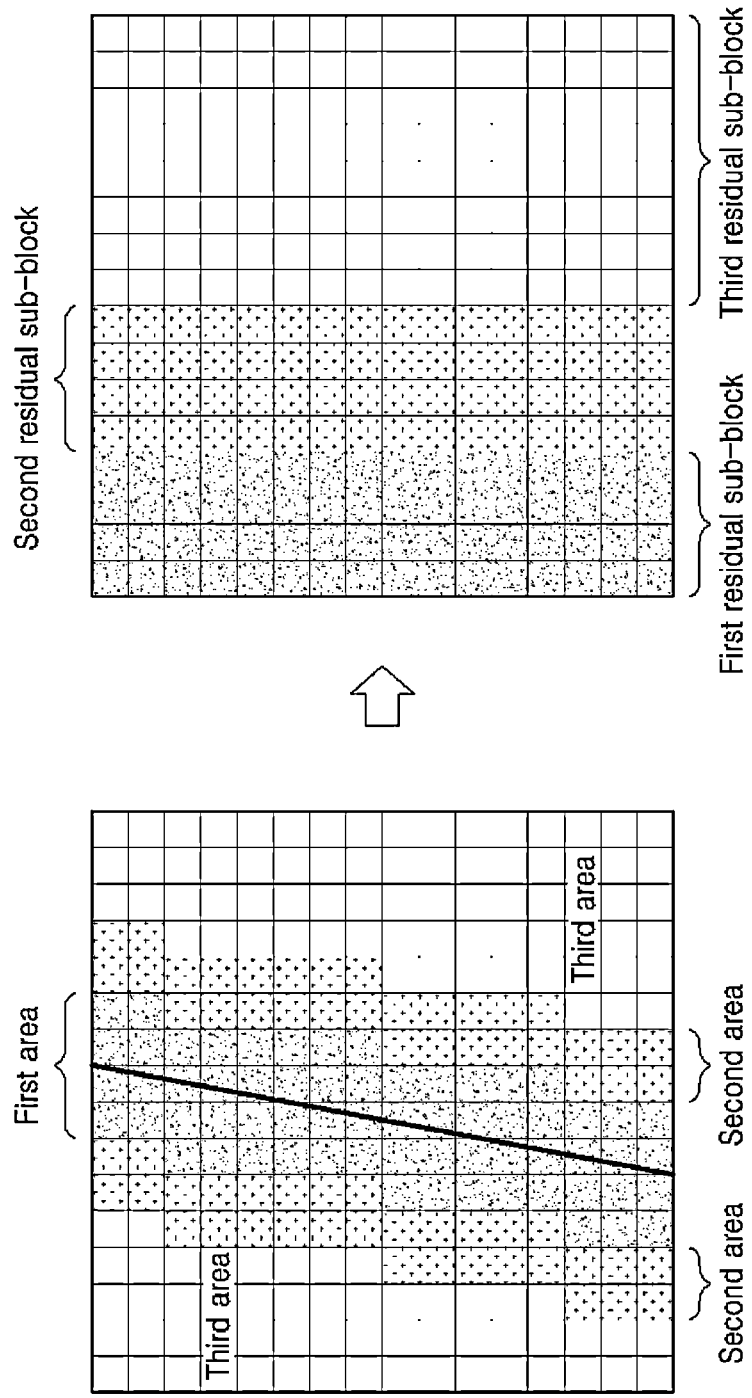

A target block may be partitioned into three or more areas rather than two areas. For example, as illustrated in FIG. 15, the target block may be partitioned into three areas (first to third areas) according to the distance from the boundary line. Residual signals in each area are rearranged to generate rectangular residual sub-blocks. The size of each area is determined according to the size of the transform unit determined in accordance with the area. The number of samples in each area is determined to be equal to the number of samples of the corresponding transform unit.

The transformer 140 transforms and quantizes each rectangular residual sub-block to generate a plurality of transform coefficient blocks S1340. Transform information, which includes information on the transform coefficients of transform coefficient blocks and information on the transform unit, is encoded by the encoder 155 and transmitted to the video decoding apparatus S1350. The transform information may further include information on the transform kernel.

Meanwhile, although the embodiments above assume that all of the residual sub-blocks corresponding to the respective areas are transformed, quantized, and encoded, it is also possible that only part of the residual sub-blocks is transformed, quantized, and encoded. The remaining residual sub-blocks are padded with zeros. For example, for a target block predicted through geometric partitioning, only the boundary area including the boundary line among a plurality of areas may be encoded. Alternatively, one or more areas to be transformed, quantized, and encoded may be selected among a plurality of areas, and information indicating the selected area may be signaled to the video decoding apparatus.

Figure 16:
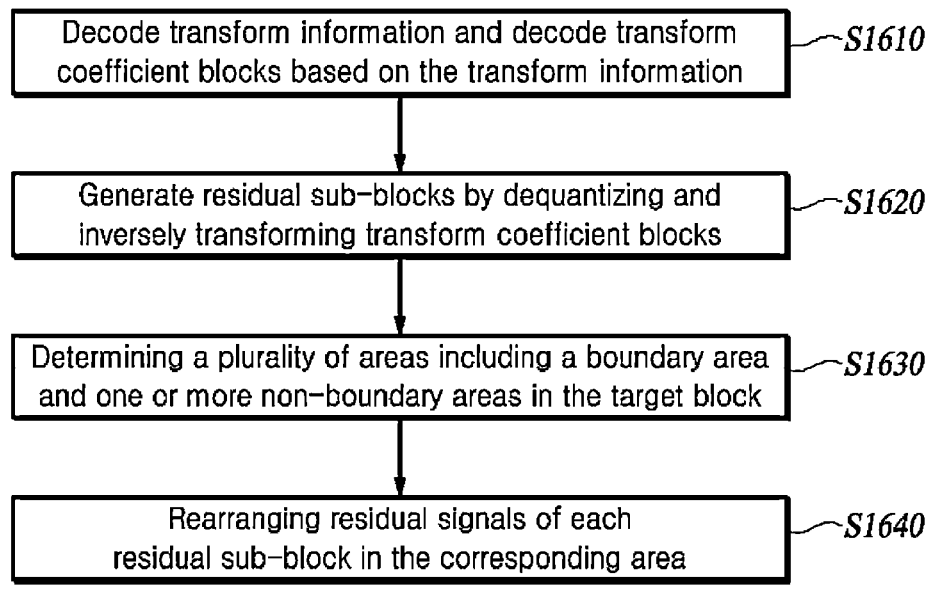
FIG. 16 is a flow diagram illustrating a decoding method, performed by a video decoding apparatus, corresponding to the encoding method of FIG. 13.

FIG. 16 is a flow diagram illustrating a decoding method, performed by a video decoding apparatus, corresponding to the encoding method of FIG. 13.

The decoder 510 of the video decoding apparatus decodes transform information from a bitstream. The decoder 510, based on the transform information, determines transform units having a rectangular or square shape and generates transform coefficient blocks by decoding transform coefficients corresponding to the respective transform units S1610. The inverse quantizer 520 of the video decoding apparatus dequantizes or inversely quantizes each transform coefficient block, and the inverse transformer 530 inversely transforms the dequantized transform coefficient blocks to generate residual sub-blocks S1620.

The inverse transformer 530 determines a plurality of areas within the target block by considering the boundary line specified by the information on the boundary line, the number of transform units, and the size of each transform unit. In other words, the inverse transformer 530 determines a boundary area including the boundary line and one or more non-boundary areas not including the boundary line within the target block S1630. To identify the plurality of areas, information on the transform kernel included in the transform information may be further considered in addition to the sizes of the transform units. The inverse transformer 530 generates a residual block for the target block by disposing or rearranging the residual signals of each residual sub-block in the corresponding area S1640.

As described above, the video encoding apparatus may encode and transmit only a part of a plurality of areas including the boundary area and one or more non-boundary areas. In this case, the video decoding apparatus decodes, dequantizes, and inversely transforms only the transform coefficient block corresponding to the part of the plurality of areas encoded by the video encoding apparatus to generate a residual sub-block. Then, the video decoding apparatus rearranges the residual signals within the residual sub-block in the corresponding area. The rest of the area is padded with zeros.

Which area among a plurality of areas is encoded may be predetermined between the video encoding apparatus and the video decoding apparatus, or the video encoding apparatus may signal the information indicating the encoded area to the video decoding apparatus.

In the embodiment of FIG. 12, after determining a rectangular or square-shaped transform unit, the video encoding apparatus partitions the target block into a plurality of areas according to the transform unit and rearranges pixels within each area according to the size of the transform unit to generate a rectangular shaped residual sub-block. FIG. 16 illustrates a decoding operation corresponding to the encoding operation of FIG. 12.

As another embodiment, the transformer 140 may determine a transform unit after first partitioning the target block into a plurality of areas.

The transformer 140 partitions the target block into a boundary area including a boundary line and one or more non-boundary areas not including the boundary line. Here, how to configure the boundary area and the non-boundary areas may be preconfigured between the encoding apparatus and the decoding apparatus according to the type of the boundary line (e.g., the intersection where the boundary line meets each side of the target block, or the angle of the boundary line and the location of the boundary line). Alternatively, information related to area partitioning may be determined at a level higher than the block level, such as the sequence level, picture level, slice level, or tile level, and signaled to the video decoding apparatus.

After the plurality of areas are determined, the transformer 140 determines a rectangular or square-shaped transform unit corresponding to each area by considering the total number of pixels within each area or the number of pixels in the horizontal and vertical directions. The transformer 140 then rearranges residual signals within each area according to the sizes of the transform units to generate rectangular or square-shaped residual sub-blocks.

In the present embodiment, additional signaling of transform information related to the size of the transform unit may not be required. It is so because the video decoding apparatus may determine the type of the boundary line from information on the boundary line and determine the transform unit from the type of the boundary line.

The video decoding apparatus identifies the type of the boundary line based on the information on the boundary line and determines rectangular or square-shaped transformation units according to the boundary line type. Then, the video decoding apparatus decodes transform coefficients corresponding to the respective transform units to generate a plurality of transform coefficient blocks and generates residual sub-blocks by inversely quantizing and inversely transforming the transform coefficient blocks. The video decoding apparatus identifies a boundary area including the boundary line and one or more non-boundary areas not including the boundary line within the target block, by considering the boundary line and the sizes of transform units. Then, the video decoding apparatus generates a residual block of the target block by rearranging residual signals within each residual sub-block in the corresponding area.

Figure 17:
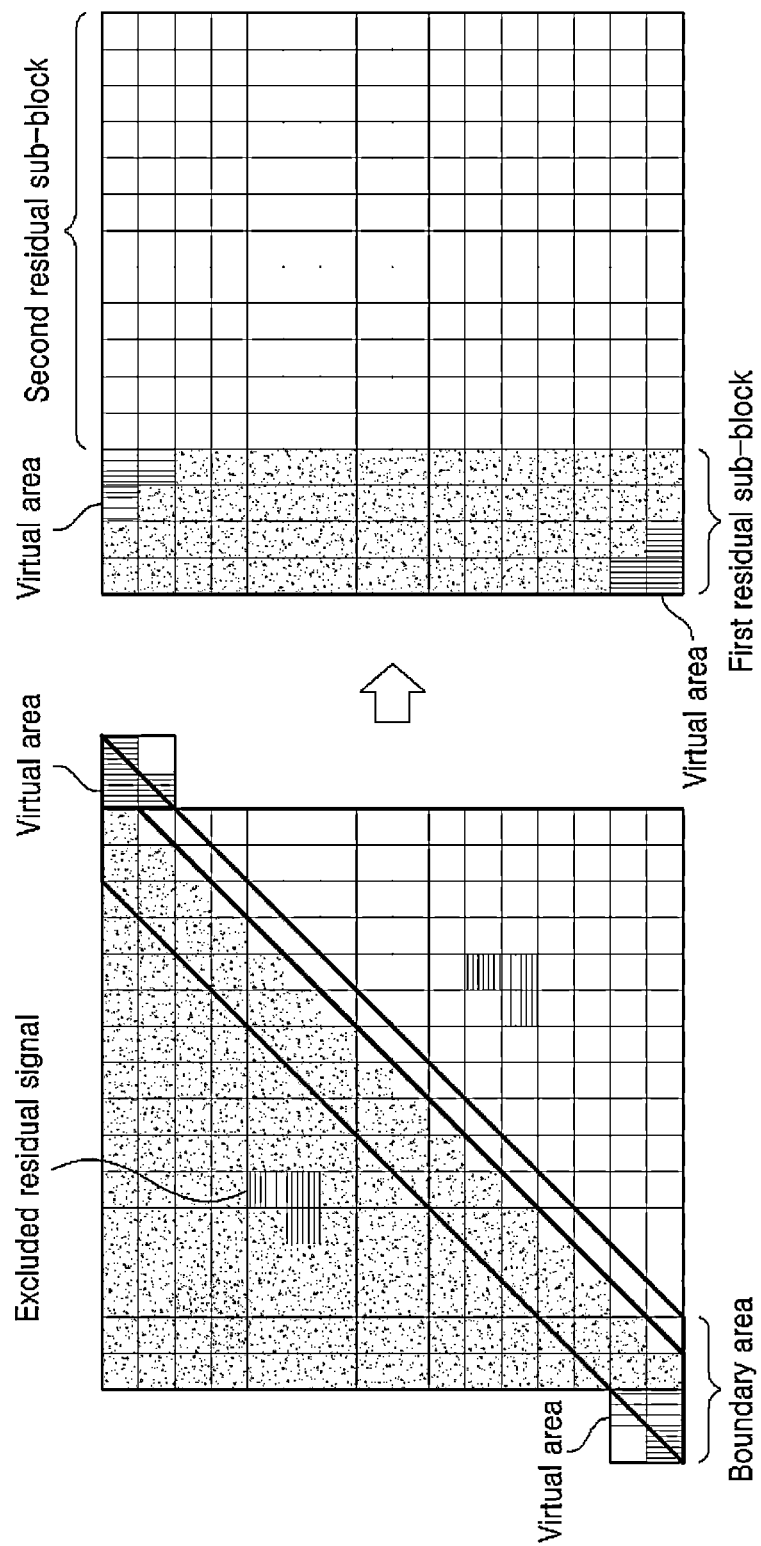
FIG. 17 is another diagram illustrating a method for partitioning a target block into non-rectangular areas and rearranging residual signals within a non-rectangular area according one aspect of the present disclosure.

In another embodiment, the video encoding apparatus may set a virtual area outside the target block based on the boundary line and set the boundary area to include the virtual area in addition to the area inside the target block. Residual signals in the virtual area are padded with a specific fixed value or values of residual signals inside the target block. Referring to FIG. 17, a virtual line parallel to the boundary line is set in each of the two areas partitioned by the boundary line. The area formed between the two virtual lines is set as a boundary area. At this time, triangular areas formed at the bottom left corner and top right corner of the target block may be set as virtual areas. Residual signals in the boundary area including the virtual area are rearranged into a rectangular or square-shaped first residual sub-block. Since the target block has a rectangular or square shape and the boundary area includes the virtual area outside the target block, residual signals in the non-boundary area except for the boundary area within the target block may not be rearranged in a rectangular or square shape. Therefore, when rearranging the residual signals in the non-boundary area into a rectangular or square-shaped second residual sub-block, the video encoding apparatus excludes the same number of residual signals as the number of residual signals in the virtual area from the non-boundary area. The locations in the non-boundary area from which the residual signals are excluded may be pre-defined between the encoding apparatus and the decoding apparatus, or information on the locations from which the residual signals are excluded may be signaled from the encoding apparatus to the decoding apparatus.

In the same way as described in other embodiments, the video decoding apparatus rearranges the residual signals in the first residual sub-block into the boundary area after reconstructing the first residual sub-block. In this case, the padded virtual area is excluded. Meanwhile, the residual signals in the second residual sub-block are rearranged into the non-boundary area. Residual signals excluded from the non-boundary area by the encoding apparatus are filled with predicted values. For example, residual signals that have been excluded may be padded with a specific value or may be padded with an average value of neighboring residual signals alternatively. As another method, the area from which the residual signals are excluded may be filled with reconstructed pixel values around the excluded area at a pixel level after reconstruction, not at the residual level. The video decoding apparatus first reconstructs pixel values for the area other than the excluded area within the target block. Then, the video decoding apparatus predicts pixel values of the excluded area using the reconstructed pixel values around the excluded area. In other words, the video decoding apparatus predicts pixel values of the excluded area so that the sum of the residual signals of the excluded area and the predicted pixels corresponding to the residual signals is equal to the weighted average value of the reconstructed pixel values around the excluded area.

In what follows, a method for quantizing or dequantizing a target block is described.

Figure 18:
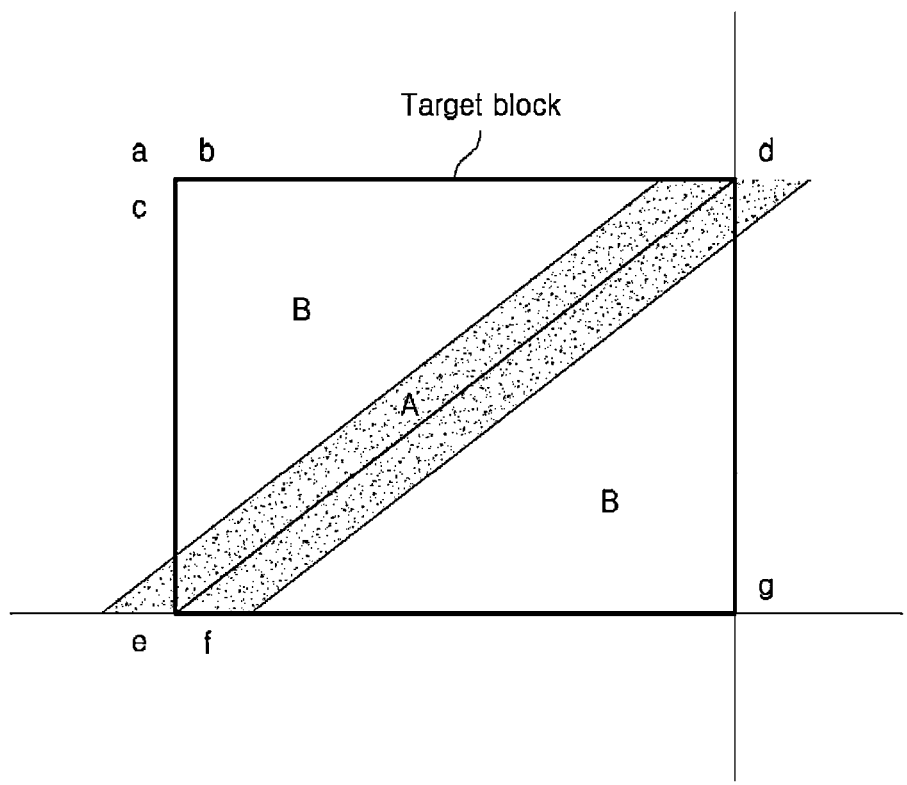
FIG. 18 illustrates a method for determining quantization parameters according to one aspect of the present disclosure.

A plurality of areas (a boundary area and one or more non-boundary areas) in the target block may be quantized or dequantized using the same quantization parameter. For example, one quantization parameter is determined for the target block, and each area shares the quantization parameter of the target block. The video encoding apparatus encodes a delta quantization parameter that is a difference between a quantization parameter of the target block and a predicted quantization parameter. Here, the predicted quantization parameters are generated from the quantization parameters of the pre-reconstructed blocks adjacent to the target block. Referring to FIG. 18, a predicted quantization parameter is generated from quantization parameters of at least part of pre-reconstructed blocks among neighboring blocks "a" to "g." For example, the video encoding apparatus may set the average value of quantization parameters of the upper block b and the left block c as the predicted quantization parameter. The video decoding apparatus derives the predicted quantization parameter in the same manner as the video encoding apparatus and calculates the quantization parameter of the target block by adding the predicted quantization parameter and the delta quantization parameter received from the video encoding apparatus.

Alternatively, quantization parameters may be independently determined for each area in the target block. The video encoding apparatus signals a delta quantization parameter to be applied to the residual signals corresponding to each area. The predicted quantization parameter of each area is predicted through the quantization parameter of a block adjacent to the corresponding area. Referring to FIG. 18, the predicted quantization parameter of area A (boundary area) is predicted from quantization parameters of at least part of neighboring blocks "d," "e," and "f." Depending on embodiments, a value used for the prediction of a quantization parameter may be limited according to the size of the boundary area A or the area ratio between areas A and B. For example, when boundary area A spans 1 to 2 pixels to the left and right of the boundary line, as shown in FIG. 17, the quantization parameter is predicted through "d" and "e." In another embodiment, if the boundary area A extends from the boundary, the prediction may be performed using "b," "c," "g," and "f" in addition to "e" and "d." The predicted quantization parameter may be an average value of quantization parameters of pre-reconstructed neighboring blocks among the neighboring blocks. On the other hand, the predicted quantization parameter of area B (non-boundary area) is predicted from quantization parameters of pre-reconstructed blocks among neighboring blocks "a" to "g." For example, the predicted quantization parameter may be an average value of the pre-reconstructed neighboring blocks.

As another alternative, the video encoding apparatus determines a quantization parameter for one area (e.g., a boundary area) among a plurality of areas and derives quantization parameters of the remaining areas by adding an offset to the quantization parameter. For example, the video encoding apparatus may transmit a delta quantization parameter for the boundary area and omit transmission of the delta quantization parameter for the non-boundary areas. In the example of FIG. 18, the prediction may be performed relatively better in the non-boundary area B than in the boundary area A. Thus, the absolute magnitudes of the residual signals may be small. Therefore, for encoding/decoding efficiency, quantization may always be performed in the non-boundary area B using quantization parameters obtained by adding an offset to the quantization parameters of the boundary area A, and transmission of a delta quantization parameter for the non-boundary area B may be omitted. The offset is a value added to the quantization parameter of the boundary area A, which may be a positive number. The offset may be adaptively determined according to the prediction mode. Different offsets may be applied depending on whether the prediction mode of the target block is an inter prediction or an intra prediction. Also, even in the inter prediction mode, a different offset may be applied depending on whether the target block is in the merge or AMVP mode. For example, in the merge mode, the offset may have the largest value, while in the intra prediction mode, the offset may have the smallest value. The video decoding apparatus calculates the predicted quantization parameter in the same way as the video encoding apparatus and determines the quantization parameter of the boundary area by adding the predicted quantization parameter and the delta quantization parameter. The quantization parameters of the remaining areas are derived by adding the same offset as that of the video encoding apparatus to the quantization parameter of the boundary area. The offset may be a pre-defined, fixed value between the video encoding apparatus and the video decoding apparatus or may be signaled at a high level.

In the description above, it should be understood that the embodiments may be implemented in various other ways. Functions described in one or more examples may be implemented in hardware, software, firmware, or any combination thereof. It should be understood that the functional components described in the present disclosure have been labeled by adding "unit" to the component name to particularly emphasize their implementation independence.

Meanwhile, various functions or methods of the present disclosure may be implemented as instructions stored in a non-transitory recording medium that may be read and executed by one or more processors. Non-transitory recording media include, for example, all types of recording devices in which data is stored in a form readable by a computer system. For example, the non-transitory recording medium includes storage media such as an erasable programmable read only memory (EPROM), a flash drive, an optical drive, a magnetic hard drive, and a solid state drive (SSD).

Although embodiments have been described for illustrative purposes, those having ordinary skill in the art should appreciate that various modifications and changes are possible, without departing from the idea and scope of the present disclosure. Embodiments have been described for the sake of brevity and clarity. Accordingly, one of ordinary skill should understand that the scope of the present disclosure is not limited by the embodiments explicitly described above but is inclusive of the claims and equivalents thereto.

What is claimed is:

1. A video decoding method for decoding a target block using intra prediction, the method comprising:
  obtaining, from a bitstream, boundary line information for identifying at least one boundary line for partitioning the target block and prediction mode information, wherein the boundary line information allows partitioning the target block into a plurality of non-rectangular blocks;
  determining intra prediction modes of the non-rectangular blocks using the prediction mode information;
  generating a prediction block of the target block by performing intra prediction on each of the non-rectangular blocks using the selected intra prediction modes;
  reconstructing a residual block of the target block from the bitstream; and
  reconstructing the target block by adding the prediction block and the residual block,
  wherein determining intra prediction modes of the non-rectangular blocks comprises, for each of the non-rectangular blocks:
    determining one or more reference positions adjacent to the target block based on a direction of the boundary line specified by the boundary line information and a location of the non-rectangular block relative to the boundary line;
    constructing a candidate list of intra prediction mode candidates to be applied to the non-rectangular block using intra prediction modes of neighboring blocks covering the reference positions; and
    selecting an intra prediction mode of the non-rectangular block from the candidate list.

2. The method of claim 1, wherein the prediction mode information includes index information for selecting one among the intra prediction modes included in the candidate list and a difference value between the intra prediction mode of the non-rectangular block and the intra prediction mode indicated by the index information.

3. The method of claim 1, wherein the generating the prediction block of the target block includes, for each of the non-rectangular blocks:
configuring pre-reconstructed reference pixels to be used to predict the non-rectangular block based on the direction and position of the boundary line specified by the boundary line information and location of the non-rectangular block relative to the boundary line; and
performing intra prediction on the non-rectangular block using the reference pixels.

4. The method of claim 1, wherein the reconstructing the residual block includes:
reconstructing a plurality of rectangular transform coefficient blocks from the bitstream;
generating residual sub-blocks by inversely transforming the transform coefficient blocks; and
reconstructing the residual block by partitioning the target block into a plurality of areas based on a boundary line specified by the boundary line information, the number of transform coefficient blocks, and sizes of each of the transform coefficient blocks and rearranging residual signals in each of the residual sub-block into a corresponding area,
wherein the plurality of areas includes a boundary area including the boundary line and being formed around the boundary line and one or more non-boundary areas not including the boundary line.

5. A video encoding method for encoding a target block using intra prediction, the method comprising:
partitioning the target block using at least one boundary line, wherein the boundary line allows partitioning the target block into a plurality of non-rectangular blocks;
determining intra prediction modes of the non-rectangular blocks;
generating a prediction block of the target block by performing intra prediction on each of the non-rectangular blocks based on the determined intra prediction modes;
generating a residual block of the target block by subtracting the prediction block from the target block;
encoding information for identifying the boundary line and the intra prediction modes of the non-rectangular blocks; and
encoding residual signals in the residual block,
wherein determining intra prediction modes of the non-rectangular blocks comprises, for each of the non-rectangular blocks:
determining one or more reference positions adjacent to the target block based on a direction of the boundary line and a location of the non-rectangular block relative to the boundary line;
constructing a candidate list of intra prediction mode candidates to be applied to the non-rectangular block using intra prediction modes of neighboring blocks covering the reference positions; and
selecting an intra prediction mode of the non-rectangular block from the candidate list.

6. The method of claim 5, wherein prediction mode information includes index information for selecting one among intra prediction modes included in the candidate list and a difference value between the intra prediction mode of the non-rectangular block and the intra prediction mode indicated by the index information.

7. The method of claim 5, wherein the generating the prediction block of the target block includes, for each of the non-rectangular blocks:
configuring pre-reconstructed reference pixels to be used to predict the non-rectangular block based on direction and position of a boundary line and location of the non-rectangular block relative to the boundary line; and
performing intra prediction on the non-rectangular block using the reference pixels.

8. The method of claim 5, wherein the encoding residual signals in the residual block includes:
partitioning the target block into a plurality of areas, wherein the plurality of areas includes a boundary area including the boundary line and being formed around the boundary line and one or more non-boundary areas not including the boundary line; and
generating a rectangular residual sub-block by rearranging residual signals in the area and transforming the residual sub-block for each of the plurality of areas.

9. A method for providing a video decoding apparatus with encoded video data, the method comprising:
encoding video data into a bitstream; and
transmitting the bitstream to the video decoding apparatus,
wherein encoding the video data comprises:
partitioning a target block using at least one boundary line, wherein the boundary line allows partitioning the target block into a plurality of non-rectangular blocks;
determining intra prediction modes of the non-rectangular blocks;
generating a prediction block of the target block by performing intra prediction on each of the non-rectangular blocks based on the determined intra prediction modes;
generating a residual block of the target block by subtracting the prediction block from the target block;
encoding information for identifying the boundary line and the intra prediction modes of the non-rectangular blocks; and
encoding residual signals in the residual block,
wherein determining intra prediction modes of the non-rectangular blocks comprises, for each of the non-rectangular blocks:
determining one or more reference positions adjacent to the target block based on a direction of the boundary line and a location of the non-rectangular block relative to the boundary line;
constructing a candidate list of intra prediction mode candidates to be applied to the non-rectangular block using intra prediction modes of neighboring blocks covering the reference positions; and
selecting an intra prediction mode of the non-rectangular block from the candidate list.

* * * * *